US011682945B2

(12) United States Patent
Rubin

(10) Patent No.: US 11,682,945 B2
(45) Date of Patent: Jun. 20, 2023

(54) HIGH TORQUE DENSITY ELECTRIC MOTOR/GENERATOR WITH ROLLING ELEMENT

(71) Applicant: Indiana University Research and Technology Corporation, Indianapolis, IN (US)

(72) Inventor: Matthew J. Rubin, Indianapolis, IN (US)

(73) Assignee: INDIANA UNIVERSITY RESEARCH AND TECHNOLOGY CORPORATION, Indianapolis, IN (US)

( * ) Notice: Subject to any disclaimer, the term of this patent is extended or adjusted under 35 U.S.C. 154(b) by 0 days.

(21) Appl. No.: 16/077,312

(22) PCT Filed: Feb. 15, 2017

(86) PCT No.: PCT/US2017/017959
§ 371 (c)(1),
(2) Date: Aug. 10, 2018

(87) PCT Pub. No.: WO2017/142940
PCT Pub. Date: Aug. 24, 2017

(65) Prior Publication Data
US 2019/0068024 A1  Feb. 28, 2019

Related U.S. Application Data

(60) Provisional application No. 62/454,334, filed on Feb. 3, 2017, provisional application No. 62/295,259, filed on Feb. 15, 2016.

(51) Int. Cl.
*H02K 7/12* (2006.01)
*H02K 41/06* (2006.01)
*H02K 1/17* (2006.01)

(52) U.S. Cl.
CPC ............... *H02K 7/12* (2013.01); *H02K 41/06* (2013.01); *H02K 41/065* (2013.01); *H02K 1/17* (2013.01)

(58) Field of Classification Search
CPC ........ H02K 7/12; H02K 41/06; H02K 41/065; H02K 1/17
(Continued)

(56) References Cited

U.S. PATENT DOCUMENTS 2,832,908 A  4/1958  Abbott
3,200,277 A  8/1965  Kober
(Continued)

FOREIGN PATENT DOCUMENTS

CA      2576182 A1    7/2008
CN    101005229 A     7/2007
(Continued)

OTHER PUBLICATIONS

International Search Report and Written Opinion issued by the ISA/US, Commissioner for Patents, dated May 8, 2017, for International Application No. PCT/US2017/017959; 11 pages.
(Continued)

*Primary Examiner* — John K Kim
(74) *Attorney, Agent, or Firm* — Faegre Drinker Biddle & Reath LLP

(57) ABSTRACT

An electric motor is provided, comprising: a first magnetic component, a second magnetic component, and a circuit configured to electromagnetically activate at least one of the first magnetic component and the second magnetic component. The electromagnetic activation causes a change in a gap between the first magnetic component and the second magnetic component, the change in the gap resulting in rotation of at least one of the first magnetic component and the second magnetic component.

4 Claims, 34 Drawing Sheets

(58) Field of Classification Search
USPC .......................................................... 310/77
See application file for complete search history.

(56) References Cited

U.S. PATENT DOCUMENTS

| | | | |
|---|---|---|---|
| 3,294,994 | A | 12/1966 | Anderson |
| 3,341,725 | A | 9/1967 | Gifford |
| 3,452,227 | A | 6/1969 | Welch |
| 3,456,139 | A | 7/1969 | Newell |
| 3,530,322 | A | 9/1970 | Newell |
| 3,746,407 | A * | 7/1973 | Stiles .................... F16C 17/026 384/133 |
| 3,813,898 | A * | 6/1974 | Hatch ....................... F16D 3/70 464/65.1 |
| 4,329,607 | A | 5/1982 | Rosain et al. |
| 4,634,950 | A | 1/1987 | Klatt |
| 4,644,208 | A | 2/1987 | Laing |
| 4,812,691 | A * | 3/1989 | Bertram .................. F16H 25/16 318/136 |
| 4,877,987 | A | 10/1989 | Flaig et al. |
| 4,923,737 | A * | 5/1990 | De La Torre ....... B29C 37/0032 264/300 |
| 5,448,117 | A | 9/1995 | Elliott |
| 5,661,350 | A * | 8/1997 | Lucidarme .......... H02K 41/033 310/12.24 |
| 5,804,898 | A | 9/1998 | Kawai |
| 6,333,576 | B1 * | 12/2001 | Ishikawa ................ H02K 1/187 310/67 R |
| 6,369,477 | B1 | 4/2002 | Bonin |
| 6,455,975 | B1 | 9/2002 | Raad et al. |
| 6,563,248 | B2 | 5/2003 | Fujita |
| 6,717,323 | B1 | 4/2004 | Soghomonian et al. |
| 6,727,630 | B1 * | 4/2004 | Maslov .................. H02K 29/03 310/156.01 |
| 7,550,894 | B2 | 6/2009 | Hino et al. |
| 7,786,646 | B2 | 8/2010 | Lu et al. |
| 7,898,135 | B2 | 3/2011 | Flynn |
| 9,000,639 | B2 * | 4/2015 | Bailey .................. H02K 1/2786 310/194 |
| 9,748,816 | B2 * | 8/2017 | Kreidler ............... H02K 21/028 |
| 10,069,368 | B2 * | 9/2018 | Chen ....................... H02K 3/522 |
| 2003/0067240 | A1 | 4/2003 | AbuAkeel |
| 2004/0072646 | A1 * | 4/2004 | Hori ........................ F16H 61/32 475/149 |
| 2005/0001501 | A1 * | 1/2005 | Fujii ....................... H02K 15/03 310/156.43 |
| 2006/0280597 | A1 * | 12/2006 | Ochiai .................... F16C 33/12 415/148 |
| 2007/0096575 | A1 * | 5/2007 | Sato ...................... H02K 1/2786 310/156.28 |
| 2007/0172371 | A1 * | 7/2007 | Podmore ............... F04C 2/1075 418/48 |
| 2007/0182259 | A1 | 8/2007 | Sakata et al. |
| 2008/0007130 | A1 | 1/2008 | Edelson |
| 2008/0224553 | A1 * | 9/2008 | Abe .......................... H02K 5/15 310/71 |
| 2009/0009011 | A1 * | 1/2009 | Edelson ................ H02K 41/06 310/48 |
| 2009/0021089 | A1 * | 1/2009 | Nashiki ................ H02K 21/145 310/46 |
| 2009/0133518 | A1 * | 5/2009 | Kawamoto ............ H02K 7/116 74/89 |
| 2011/0072926 | A1 | 3/2011 | Yang |
| 2011/0150686 | A1 * | 6/2011 | Trushin ..................... E21B 4/02 418/48 |
| 2012/0098371 | A1 * | 4/2012 | Pinneo .................. H02K 7/025 310/90.5 |
| 2013/0194907 | A1 * | 8/2013 | Kodama ............ G11B 19/2009 369/264 |
| 2013/0293027 | A1 | 11/2013 | Kim et al. |
| 2013/0293037 | A1 | 11/2013 | Sakamoto et al. |
| 2013/0337957 | A1 | 12/2013 | Vranish |
| 2014/0167532 | A1 * | 6/2014 | Park ....................... H02K 1/2733 310/45 |
| 2014/0184002 | A1 * | 7/2014 | Levin ....................... H02K 7/08 310/90 |
| 2015/0035405 | A1 | 2/2015 | Littlejohn et al. |
| 2015/0076947 | A1 * | 3/2015 | Veeh ....................... H02K 5/163 310/88 |
| 2015/0349590 | A1 * | 12/2015 | Brennvall ................ H02K 3/12 310/49.43 |
| 2016/0036366 | A1 * | 2/2016 | Yang .................... H02K 19/103 318/701 |
| 2016/0164394 | A1 * | 6/2016 | Knaian ................ H02K 21/046 310/12.17 |
| 2016/0230894 | A1 * | 8/2016 | Shannon ................. F16J 15/43 |
| 2017/0338705 | A1 * | 11/2017 | Klassen ................... B25J 9/108 |
| 2019/0068024 | A1 * | 2/2019 | Rubin .................... H02K 41/06 |

FOREIGN PATENT DOCUMENTS

| | | | |
|---|---|---|---|
| CN | 103444062 A | 12/2013 | |
| DE | 10309076 A1 | 9/2004 | |
| DE | 10 2014 001 263 B4 | 6/2017 | |
| FR | 2926685 A1 * | 7/2009 | ............... H02K 1/06 |
| GB | 2062974 A | 5/1981 | |
| GB | 2094066 A | 9/1982 | |
| JP | 01-315251 A | 12/1989 | |
| JP | 02-294259 A | 12/1990 | |
| JP | H0340749 A | 2/1991 | |
| JP | 2009195025 A | 8/2009 | |
| WO | WO 00/70729 | 11/2000 | |
| WO | 2014046487 A1 | 3/2014 | |

OTHER PUBLICATIONS

International Search Report and Written Opinion issued by the ISA/US, Commissioner for Patents, dated Apr. 13, 2016 for International Application No. PCT/US2016/016978; 6 pages.

International Preliminary Report on Patentability issued by The International Bureau of WIPO, Geneva, Switzerland, dated Aug. 15, 2017 for International Application No. PCT/US2016/016978; 5 pages.

International Preliminary Report on Patentability issued by The International Bureau of WIPO, Geneva, Switzerland, dated Aug. 21, 2017 for International Application No. PCT/US2017/017959; 10 pages.

Extended European Search Report issued by the European Patent Office, Munich, Germany, dated Sep. 10, 2019, for European Patent Application No. 17753751.1.

* cited by examiner

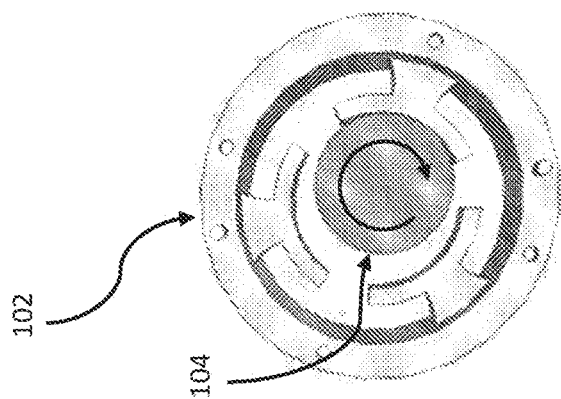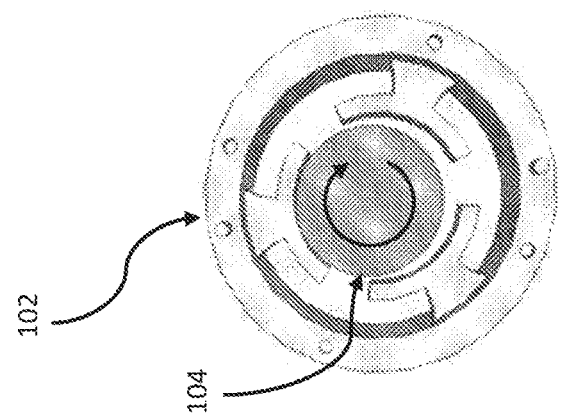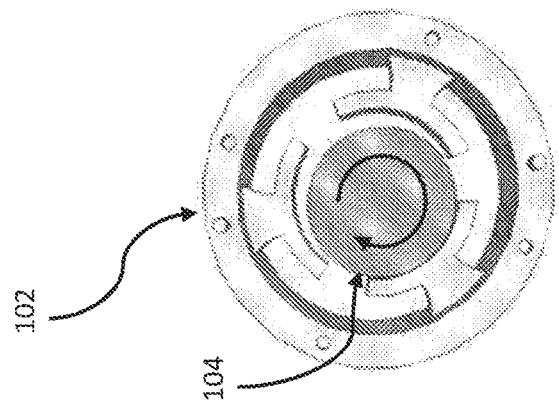
FIG. 7C

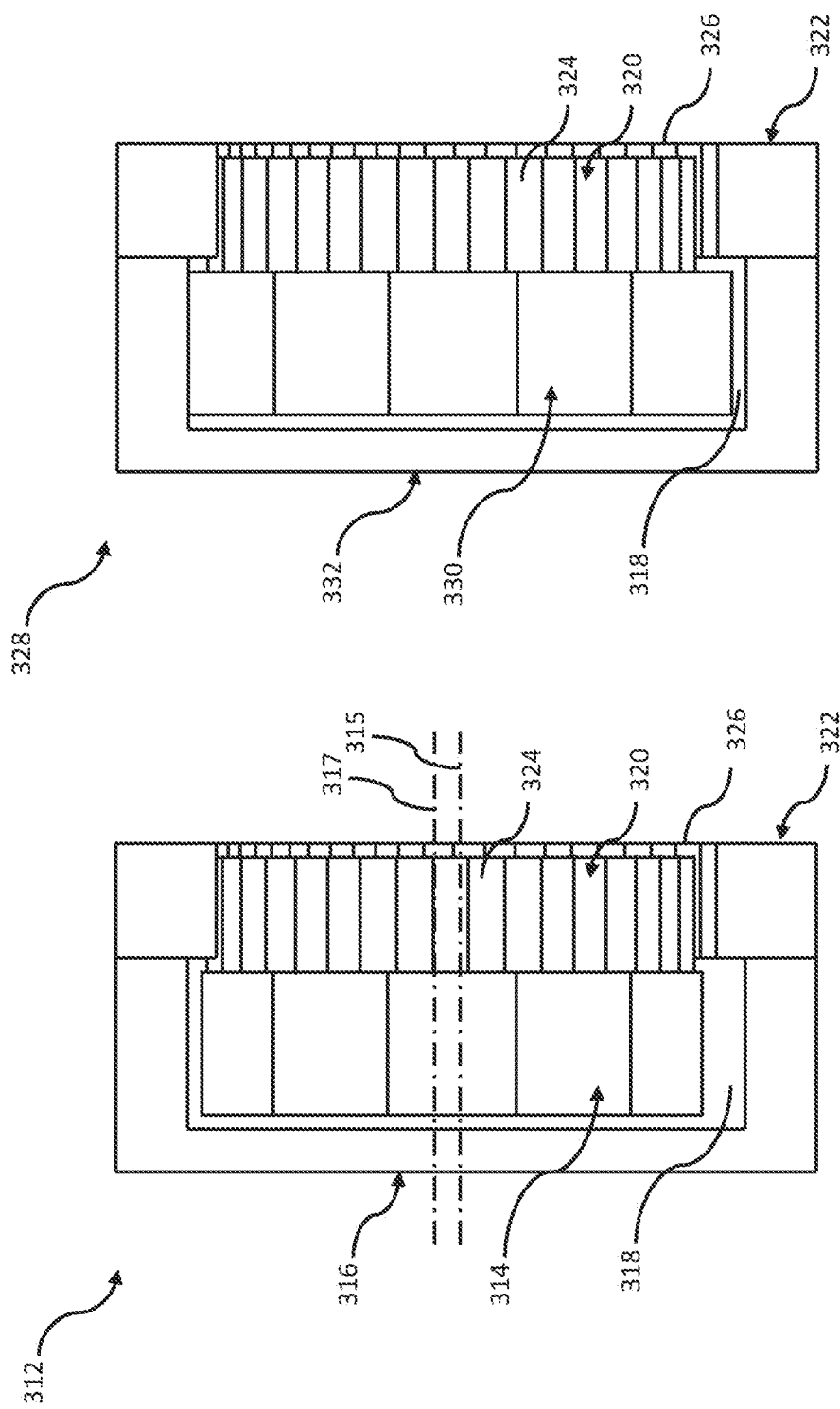

HIGH TORQUE DENSITY ELECTRIC MOTOR/GENERATOR WITH ROLLING ELEMENT

CROSS-REFERENCE TO RELATED APPLICATIONS

This application is a national phase filing of International Application No. PCT/US2017/017959, entitled "HIGH TORQUE DENSITY ELECTRIC MOTOR/GENERATOR WITH ROLLING ELEMENT," filed on Feb. 15, 2017, which claims priority to U.S. Provisional Application Ser. No. 62/295,259 entitled "HIGH TORQUE DENSITY ELECTRIC MOTOR AND/OR GENERATOR WITH ROLLING ELEMENT," filed on Feb. 15, 2016 and U.S. Provisional Application Ser. No. 62/454,334 entitled "HIGH TORQUE DENSITY ELECTRIC MOTOR/GENERATOR WITH ROLLING ELEMENT," filed on Feb. 3, 2017, the entire disclosures of which being hereby expressly incorporated herein by reference.

TECHNICAL FIELD

The present disclosure relates generally to electric motors and/or generators, and more particularly to electric motors having a rolling element resulting in a varying gap between an element associated with a rotor and an element associated with a stator, wherein the varying gap results in high torque rotational motion of the rolling element, the stator or both.

BACKGROUND

A quarter of the electrical energy globally is consumed by electrical motors or devices for transducing electrical power into mechanical power (or vice versa). In part due to their high efficiency, electrical motors are one of the first options used to generate mechanical torque in different applications ranging from operation of industrial systems to pumping systems to hybrid vehicles to personal appliances, etc. As used herein, the term "electric motor: refers to electric motors and electric generators.

Although electric motors have a significant torque density (i.e., torque per unit of motor volume) for the applications mentioned previously, there are other applications (e.g., cranes and winches) where electric motors are not considered a competitive technology as compared to hydraulic motors due to torque density limitations. Hydraulic systems, however, face at least two major problems. First, they are remarkably inefficient with efficiencies ranging from 6 to 40%. Second, hydraulic motors present a complex braking system.

Torque density of electric motors is also limited by a limited ability to dissipate heat generated by the motor windings. Heat buildup in an electrical circuit is a function of $I^2R$; therefore, a moderate increase in the electrical current for a given wiring (electrical resistance, R) will result in a significant increase in heat production. $I^2R$ losses in a typical industrial electrical motor account for 40-65% of all motor losses, far higher than any other single source of loss. The electrical current necessary to generate a given field is determined by the permeability of the magnetic circuit. The biggest decrease in magnetic permeability (increase in magnetic reluctance) is the air gap separating the stator and the rotor. Air gaps, typically in the range of 0.004 to two inches or more, may decrease the relative magnetic permeability of a circuit by over 100 times, therefore requiring 100 times more magnetizing current (in amp-turns) to generate the same field strength. While air gaps are engineered to be as small as possible, machining tolerances limit the minimum tolerance necessary to prevent the collision between the stator and rotor, often referred to as "walling," which will rapidly damage the motor. Conventional motor design has worked for years to optimize the material selection and air gap width based on commercially reasonable manufacturing techniques. Once the reluctance of the magnetic circuit has been optimized, the only source of further performance improvement is decreasing electrical resistance.

Achieving high-torque density has always been one of the goals of electrical motor designers, and has inspired new designs as presented in the technical literature. For example, although the high torque generated by switched reluctance motors and motors with partitioned rotors are one of the highest among electrical motors, such motors do not generate torque density that is comparable with hydraulic motors. Other examples of non-conventional designs of electrical machines and control strategies proposed by industry and academia include: 1) a dual rotor structure along with a dual excitation, 2) an outer rotor hybrid excitation, 3) new control strategies proposed in order to enhance the mechanical torque, and 4) injection of third harmonic current. In other conventional applications, the low torque density of electric motors is addressed in part through use of mechanical transmissions, such as gearboxes or belt drives, which increase the torque applied to an output shaft. Unfortunately, typical transmission efficiencies range from 40% or less for worm gears, to 90% for single stage properly sized belt or planetary gear transmissions; thereby, decreasing the total electric-gearbox system efficiency to less than 70% during normal use in most applications.

Therefore, in order to further increase the continuous operating torque and power density of electric motors there is a need for new designs that enable more efficient transduction of electrical energy into mechanical energy.

SUMMARY

According to one embodiment, an electric motor is provided, comprising: a first magnetic component; a second magnetic component; and a circuit configured to electromagnetically activate at least one of the first magnetic component and the second magnetic component; wherein the electromagnetic activation causes a change in a gap between the first magnetic component and the second magnetic component, the change in the gap resulting in rotation of at least one of the first magnetic component and the second magnetic component. In one aspect of this embodiment, a surface velocity of the first magnetic component is substantially the same as a surface velocity of the second magnetic component during the rotation of at least one of the first magnetic component and the second magnetic component. In another aspect, the change in the gap results in rotation of the second magnetic component about an axis of the second magnetic component and movement of the axis relative to the first magnetic component. In still another aspect, a surface of the first magnetic component remains in contact with a surface of the second magnetic component during the rotation of at least one of the first magnetic component and the second magnetic component. In a variant of this aspect, the surface of the first magnetic component comprises a first plurality of surface features and the surface of the second magnetic component comprises a second plurality of surface features that mesh with the first plurality of surface features during the rotation of at least one of the first magnetic component and the second magnetic component. In another aspect of this embodiment, the first magnetic component comprises a plurality of poles, each pole having a contact surface that is contacted by a contact surface of the second magnetic component during the rotation of at least one of the first magnetic component and the second magnetic component. In a variant of this aspect, the plurality of poles form two parallel races separated by a gap, the second magnetic component being positioned to bridge the gap to reduce reluctance of a magnetic circuit including the first magnetic component and the second magnetic component. In yet another aspect of this embodiment, the second magnetic component comprises a plurality of rollers connected by a support structure and spaced around at least one race formed by the first magnetic component. In a variant of this aspect, each of the plurality of rollers comprises a cylindrical body. In another aspect of this embodiment, the first magnetic component comprises a plurality of poles, each pole including a first curved plate and a second curved plate connected to the first curved plate by a pair of rods. In another aspect, the first magnetic component is disposed at least partially within the second magnetic component. In still another aspect, the first magnetic component comprises a plurality of poles, each pole having a contact surface directed toward a central axis of the first magnetic component. Another aspect further comprises a first engagement element coupled to the first magnetic component, the first engagement element being offset from the first magnetic component along a central axis of the first magnetic component, and a second engagement element coupled to the second magnetic component, the second engagement element being offset from the second magnetic component along a central axis of the second magnetic component and engaging the first engagement element during the rotation of at least one of the first magnetic component and the second magnetic component. Yet another aspect further comprises a drive assembly having a drive plate, a drive shaft extending perpendicularly from one surface of the drive plate, and a plurality of drive rods extending perpendicularly from another surface of the drive plate, the drive rods being spaced on the other surface to align with a plurality of drive openings formed in a drive wall of the second magnetic component. In a variant of this aspect, the change in the gap results in rotation of the second magnetic component and rotation of the second magnetic component causes the drive openings to engage the drive rods, thereby causing the drive plate and drive shaft to rotate. In a further variant, the gap is between the first magnetic component and a side wall of the second magnetic component, the drive wall of the second magnetic component extending from the side wall of the second magnetic component. In another aspect of this embodiment, the change in the gap results in rotation of the second magnetic surface, the gap being between the first magnetic component and an inner surface of the second magnetic component, the second magnetic component further comprising an outer surface having a plurality of surface features that cooperate with corresponding features of a drive element to cause motion of the drive element. In a variant of this aspect, the surface features are teeth and the drive element is a chain. In yet another aspect of this embodiment, the first magnetic component is a stator having a plurality of skewed lamination poles. In another aspect, the first magnetic component and the second magnetic component are shaped as nested cones. Still another aspect further comprises a non-magnetic liner disposed between the first magnetic component and the second magnetic component.

In another embodiment of the present disclosure, an electric motor is provided, comprising: a first magnetic component; a second magnetic component; and a circuit configured to electromagnetically activate at least one of the first magnetic component and the second magnetic component; wherein the electromagnetic activation causes the second magnetic component to rotate about an axis of the second magnetic component which moves relative to an axis of the first magnetic component. In one aspect of this embodiment, the electromagnetic activation further causes a change in a gap between the first magnetic component and the second magnetic component, the change in the gap resulting in rotation of the second magnetic component. In another aspect, the electromagnetic activation further causes the first magnetic component to rotate about the axis of the first magnetic component. In still another aspect, a surface velocity of the first magnetic component is substantially the same as a surface velocity of the second magnetic component during rotation of the second magnetic component. In yet another aspect, a surface of the first magnetic component remains in contact with a surface of the second magnetic component during rotation of the second magnetic component. In still another aspect of this embodiment, the second magnetic component comprises a plurality of rollers connected by a support structure and spaced around at least one race formed by the first magnetic component. In another aspect, the first magnetic component comprises a plurality of poles, each pole including a first curved plate and a second curved plate connected to the first curved plate by a pair of rods. In still another aspect, the first magnetic component is disposed at least partially within the second magnetic component. Another aspect further comprises a first engagement element coupled to the first magnetic component, the first engagement element being offset from the first magnetic component along the axis of the first magnetic component, and a second engagement element coupled to the second magnetic component, the second engagement element being offset from the second magnetic component along the axis of the second magnetic component and engaging the first engagement element during rotation of the second magnetic component. A variant of this aspect further comprises a drive assembly having a drive plate, a drive shaft extending from one surface of the drive plate, and a plurality of drive rods extending from another surface of the drive plate, the drive rods being spaced on the other surface to align with a plurality of drive openings formed in a drive wall of the second magnetic component. In another aspect, the second magnetic component further comprises an outer surface having a plurality of surface features that cooperate with corresponding features of a drive element to cause motion of the drive element. Yet another aspect further comprises a non-magnetic liner disposed between the first magnetic component and the second magnetic component.

In another embodiment of the present disclosure a method for generating torque is provided, comprising: arranging a first magnetic component in proximity to a second magnetic component such that a gap exists between the first magnetic component and the second magnetic component; and electromagnetically activating at least one of the first magnetic component and the second magnetic component, thereby causing a change in the gap which results in rotation of the second magnetic component relative to the first magnetic component. One aspect of this embodiment further comprises converting the rotation of the second magnetic component into motion of a drive element for performing work. Another aspect further comprises coupling a drive assembly to the second magnetic component such that rotation of the second magnetic component causes rotation of a drive shaft of the drive assembly. In another aspect, a surface velocity of the first magnetic component is substantially the same as a surface velocity of the second magnetic component during rotation of the second magnetic component. In still another aspect, the change in the gap results in rotation of the second magnetic component about an axis of the second magnetic component and movement of the central axis relative to the first magnetic component. In another aspect of this embodiment, a surface of the first magnetic component remains in contact with a surface of the second magnetic component during rotation of the second magnetic component. In another aspect, arranging a first magnetic component in proximity to a second magnetic component comprises disposing the first magnetic component at least partially within the second magnetic component.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 7C provides end views depicting continuous rotor movement according to the applied current of FIG. 7B;

FIG. 13E is a graph of experimental results of the motor of FIGS. 13A-D;

FIGS. 28A and 28B are side views of motor designs using engagement elements.

Figure 1:
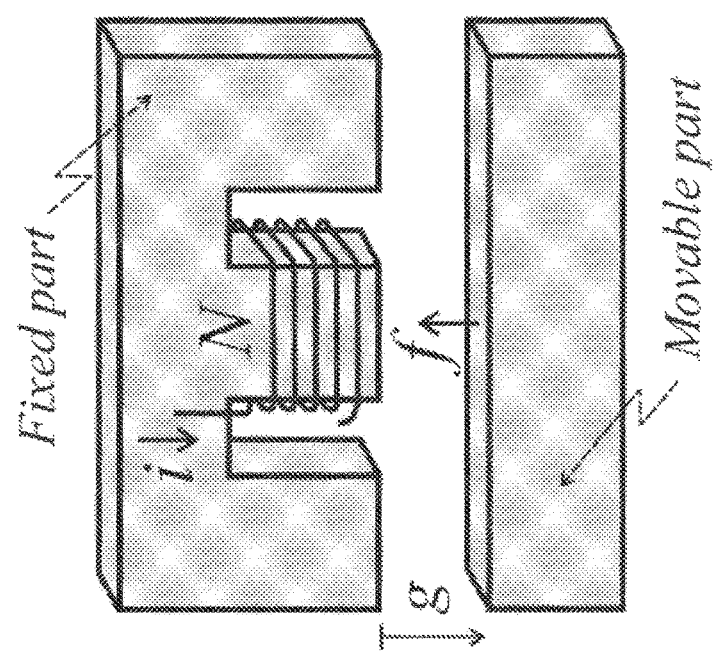
FIG. 1 is a perspective view of an E-core magnetic device.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the invention in any manner. The present disclosure is intended to cover all modifications, equivalents, and alternatives falling within the scope of the appended claims.

DETAILED DESCRIPTION

Conventional electric motors comprise a stator and a rotor, wherein a changing electromagnetic field transmitted across an air gap between the stator and rotor generates a torque between the stator and rotor. If the torque is sufficient to overcome static friction, the rotor surface will shear past the stator surface resulting in relative motion of the two surfaces, which may be used to perform work. In conventional motor design the gap between the stator and rotor is a source of high potential shear friction loss (resulting from active collision or walling), and is traditionally buffered by a small air gap, often filled with air or cooling fluid. During operation, the magnetic fields that apply torque between the stator and rotor also provide a destabilizing attractive force, often over 80 PSI at the rotor surface for high performance motors. Without constant radial support and a highly rigid structure, this force would result in immediate destabilization and walling of the stator and rotor.

As is further described below, the present disclosure overcomes certain limitations of conventional electric motor designs and enables varying air gap operation for a wide range of motor sizes from sub horsepower machines to several thousand horsepower machines. In certain embodiments, the varying air gap may be a zero air gap, which is defined herein as a gap between two objects of less than 0.001 inches, more preferably less than 0.0005 inches, and even more preferably less than 0.0002 inches. Varying air gap operation may result in a decrease in the total magnetic reluctance of the circuit by 50 to more than 100 times; thereby enabling greater torque for a given electrical current in the system as is described in detail below. This enables higher field strength for a given current and greater volumetric torque density. As described below, in certain embodiments the magnetic components of the motor do not contact one another, but engagement elements coupled to the magnetic components do make contact, thereby transferring torque.

Unlike traditional motors, where the dimensions of the stator are more or less the dimensions of the rotor (i.e., a constant gap exists between the two components) and the surfaces shear past one another during operation, a motor according to the present disclosure utilizes at least one rolling element (or roller) to travel relative to an electromagnet element wherein the surfaces have minimal relative surface movement during operation and rolling element translation. Conventional motors are designed to minimize or eliminate any variation in the gap between the stator and the rotor because such a variation causes eccentric force (and potentially catastrophic failure). As described below, the embodiments of the present disclosure are designed to take advantage of a varying gap between the two magnetic components to create significantly higher torque.

More specifically, the embodiments of the present disclosure utilize components that operate with substantially the same surface velocity. When components move relative to each other with substantially the same surface velocity, the result is a rolling type motion. Substantially the same surface velocity may mean herein that the intended mode of operation utilizes a rolling surface as opposed to a sliding surface. In conventional electric motors, the surfaces between the stator and the rotor are separated by air or some other fluid and slide, or shear, with respect to each other during normal operation as described above. Any rolling in a conventional electric motor between the stator and the rotor represents a failure mode that often results in catastrophic damage to the motor. While it is understood that all rolling objects, such as tires or gears, have some secondary sliding mode during normal operation in the real world (i.e., there is no perfect roller), the intended mode of operation of the embodiments of the present disclosure is rolling, and sliding represents a mode of failure or wear with undesirable consequences.

Motor Operation Principle

Traditional electric motors with a constant air gap allow the movable part (typically, the rotor) to spin freely relative to the stationary part (typically, the stator). The term "spin" should be understood as referring to relative surface velocity. Rolling element motors have little or no relative surface velocity as described above. Although the air gap presence is fundamental in creating rotational movement, designers try to minimize its size to maximize internal flux and consequently torque. This family of motors of the present disclosure is based on the principle behind magnetic devices that produce linear force, such as relays with E-core as shown in FIG. 1.

Note that the expression of force in this type of device indicates that the attraction observed by the movable part is directly proportional to the current squared ($i^2$), number of turns (N), and inversely proportional to the air gap squared ($g^2$), i.e., $f \approx ki^2N/g^2$; where k is a function of the permeability of the material, and its dimensions. This force results in radial pressure in conventional motors and may cause "cogging torque," which is undesirable and minimized in all non-reluctance motors. Some conventional motors generate torque according to F=ILB pressure where a force is exerted on a current carrying wire perpendicular to both a field and the current's direction (according to the "right-hand rule"). Therefore, the force is maximized if the gap is minimized (i.e., zero air gap), which happens when the movable component contacts the stationary component. Conventional electric motors with high relative surface velocities (that spin) cannot, however, decrease the gap lower than the eccentricity of the motor or walling would occur. It should be understood that in the present disclosure, any reference to objects "contact" or "touching" is meant to refer to the common usage of these terms, and ignores the quantum mechanical reality that electron repulsion prevents actual contact between objects. It should also be understood that even though the term "zero air gap" is used herein, g cannot technically be zero due to the roughness of the contact between both parts (movable and stationary, where applicable).

A motor according to the present disclosure therefore is driven by the concept of a varying or changing air gap to generate maximum linear force. While the present disclosure refers to an "air gap," it should be understood that the gap may be filled with another fluid or liquid in certain embodiments. It should further be understood that depending upon the embodiment, the changing gap between the magnetic components may vary between a zero air gap and a small, non-zero air gap, or between a non-zero air gap to a larger non-zero air gap (especially in large volume motors). In all embodiments, however, the motors use contact between the stator and rotor (or two rotors) or between engagement elements coupled to the stator and the rotor (or two rotors) to maximize force and rotational torque. Unlike conventional motors, which generate torque magnetically, wherein the fields of the rotor attempt to align with the fields of the stator, the motors of the present disclosure develop torque mechanically, wherein the eccentric magnetic pressure translates into torque as the gap between the stator and rotor (or two rotors) varies and the contact surfaces mechanically act upon each other. Therefore, the present disclosure does not generate torque if the stator and rotor or engagement elements coupled to the stator and rotor are free from contact, whereas conventional motors do.

Figure 2:
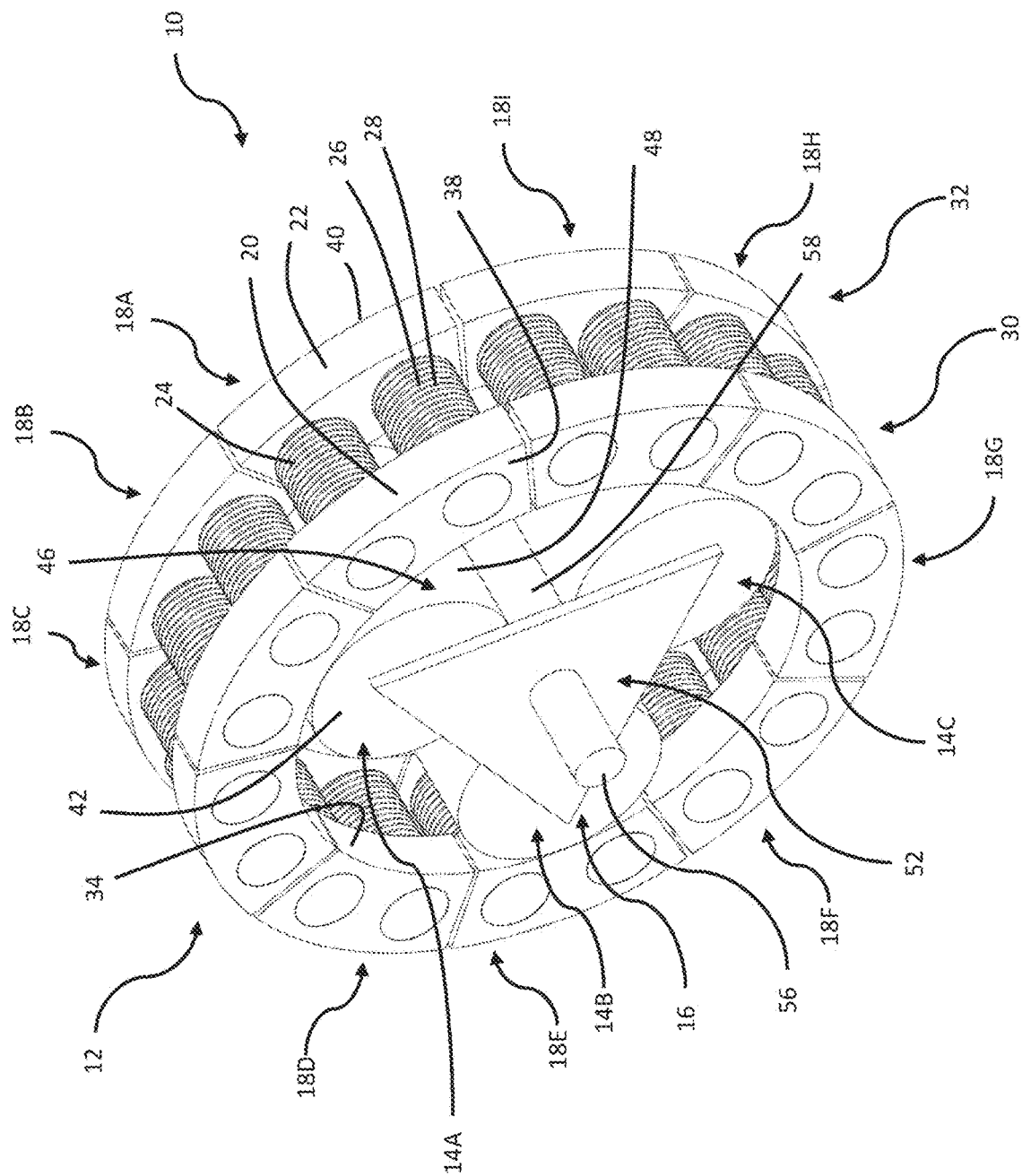
FIG. 2 is a perspective view of a motor according one embodiment of the present disclosure in an assembled configuration.
Figure 3:
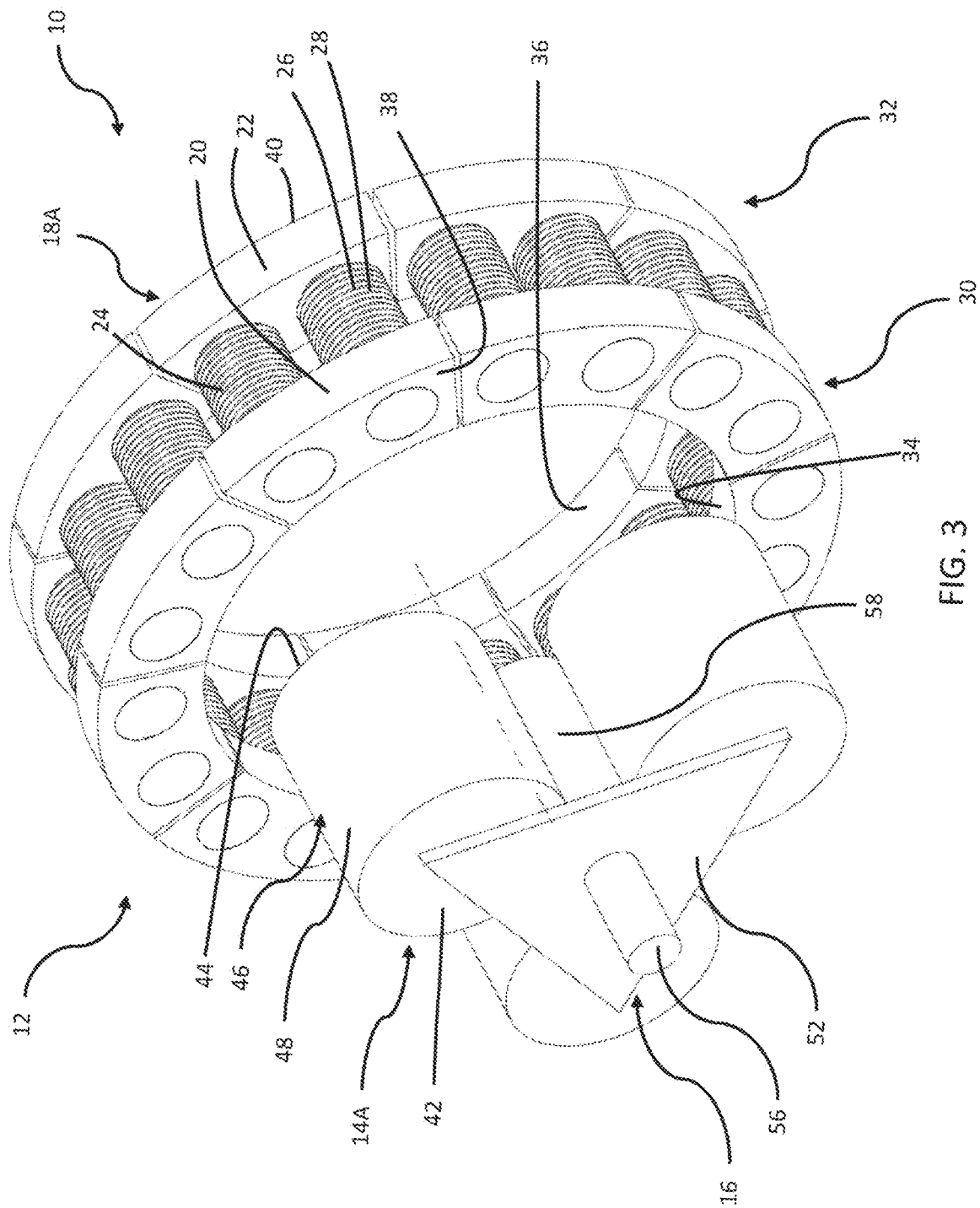
FIG. 3 is a perspective view of the motor of FIG. 2 in a partially disassembled configuration.
Figure 4:
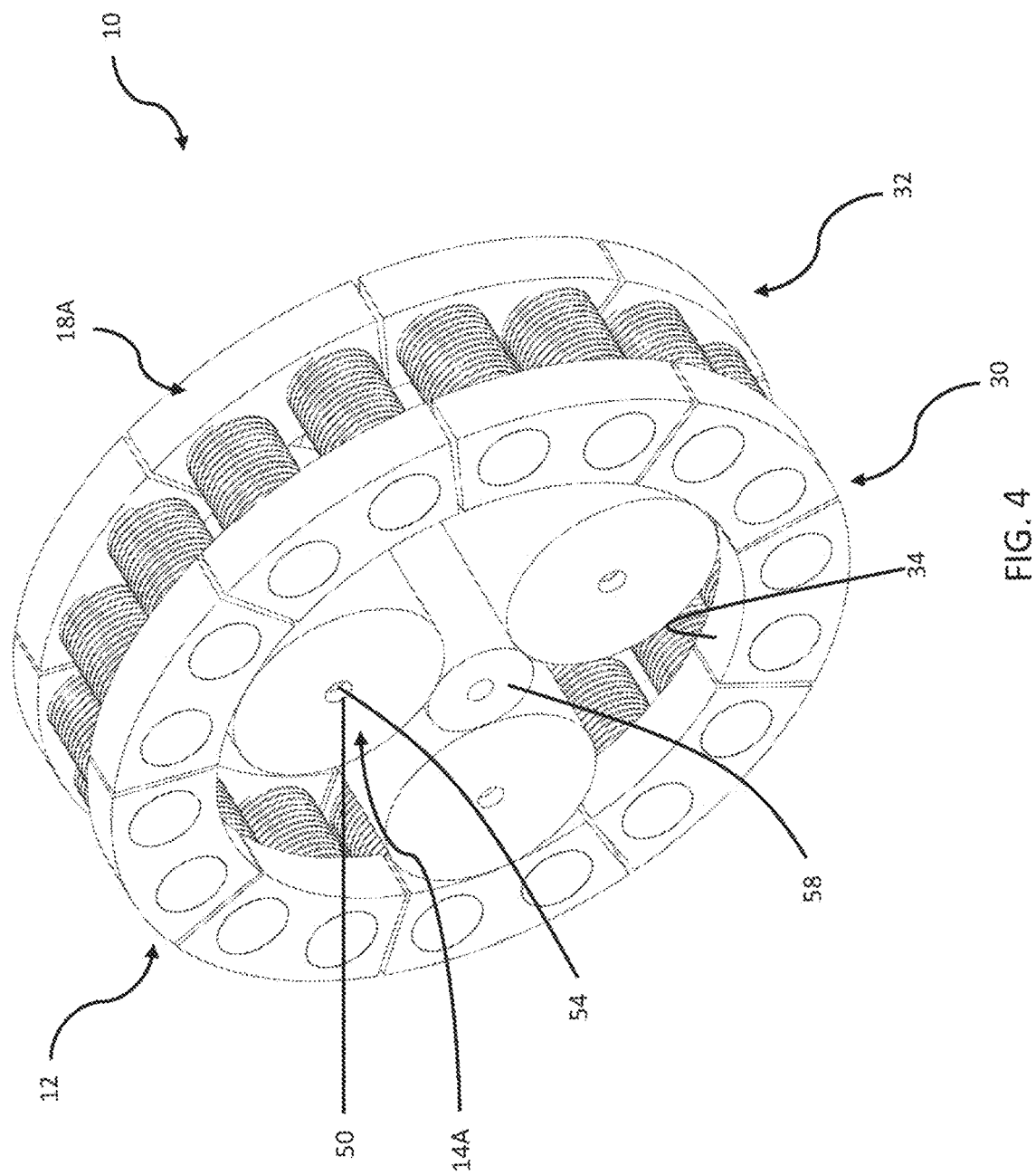
FIG. 4 is another perspective view of the motor of FIG. 2.

Referring now to FIGS. 2-4, one example of a motor 10 according to the present disclosure is shown. In this embodiment, motor 10 generally includes a stator 12, three rollers 14A-14C, and a support structure 16. In this example, stator 12 includes nine pole element segments 18A-18I, which are identical to one another. Accordingly, for brevity only segment 18A is described in detail. Segment 18A includes a first, curved plate 20, a second, curved plate 22, and a pair of independently wound electromagnetic rods 24, 26, each extending between first plate 20 and second plate 22 in substantially parallel relationship to each other. Each rod 24, 26 is wrapped with windings 28. Coil windings 28 of the present disclosure comprise at least one turn of an electrically conducting wire. Coil windings 28 may preferably comprise multiple turns of an electrically insulated wire, such as copper or aluminum coated magnet wire. Coil windings 28 may be operationally connected into phases using conventional methods, such as soldering, brazing, or welding.

As shown, first plates 20 of each of segments 18A-18I together form a circular track or race 30 and second plates 22 of each of segments 18A-18I together form another circular track or race 32 which is parallel to race 30. Race 30 includes an inner contact surface 34 and race 32 includes an inner contact surface 36 (FIG. 3) which is aligned with surface 34. While not shown in the figures, it should be understood that pole element segments 18A-18I may be supported in the orientation shown by a back plate structure made of non-ferromagnetic material such as aluminum. The back plate structure may include one back plate that is secured to the outer surfaces 38 of each of first plates 20 and another back plate that is secured to the outer surfaces 40 of each of second plates 22. Of course, additional structure may be connected to the back plate structure to mount motor 10 in its intended application.

In the depicted embodiment, rollers 14A-14C are identical. Accordingly, for brevity only roller 14A is described in detail. Roller 14A includes a first end 42, a second end 44 (FIG. 3), and a cylindrical body 46 extending between ends 42, 44. Body 46 includes an outer contact surface 48 and a central bore 50 extending between ends 42, 44. As shown, contact surface 48 engages contact surface 34 of race 30 and contact surface 36 of race 32. Rollers 14A-14C are disposed at 120 degree intervals within stator 12.

Support structure 16 includes a plate 52 configured to connect and support rollers 14A-14C. Plate 52 is depicted as a triangular, planar support member, but may be shaped in any of a variety of configurations. As best shown in FIG. 4, three posts 54 extend from plate into respective central bores 50 of rollers 14A-14C. Posts 54 support rollers 14A-14C, but the interface between posts 54 and central bores 50 permits rotation of rollers 14A-14C. To this end, central bores 50 may include bearings, lubricant or other structure that permits relative movement or some combination thereof. A first drive shaft 56 also extends from plate 52. Drive shaft 56 is rigidly connected to plate 52 and rotates with the rotatory movement of plate 52 and rollers 14A-14C. As best shown in FIG. 4, a second drive shaft 58 also extends from plate 52. Second drive shaft 58 is movably connected to plate 52 such that it may rotate relative to plate 52. Drive shaft 58 is in contact with contact surfaces 48 of rollers 14A-14C and rotates as rollers 14A-14C rotate. As should be understood from the foregoing, drive shafts 56, 58 may be coupled to gears or other power take-off mechanisms to convert the rotation of the shafts into work.

Figure 5:
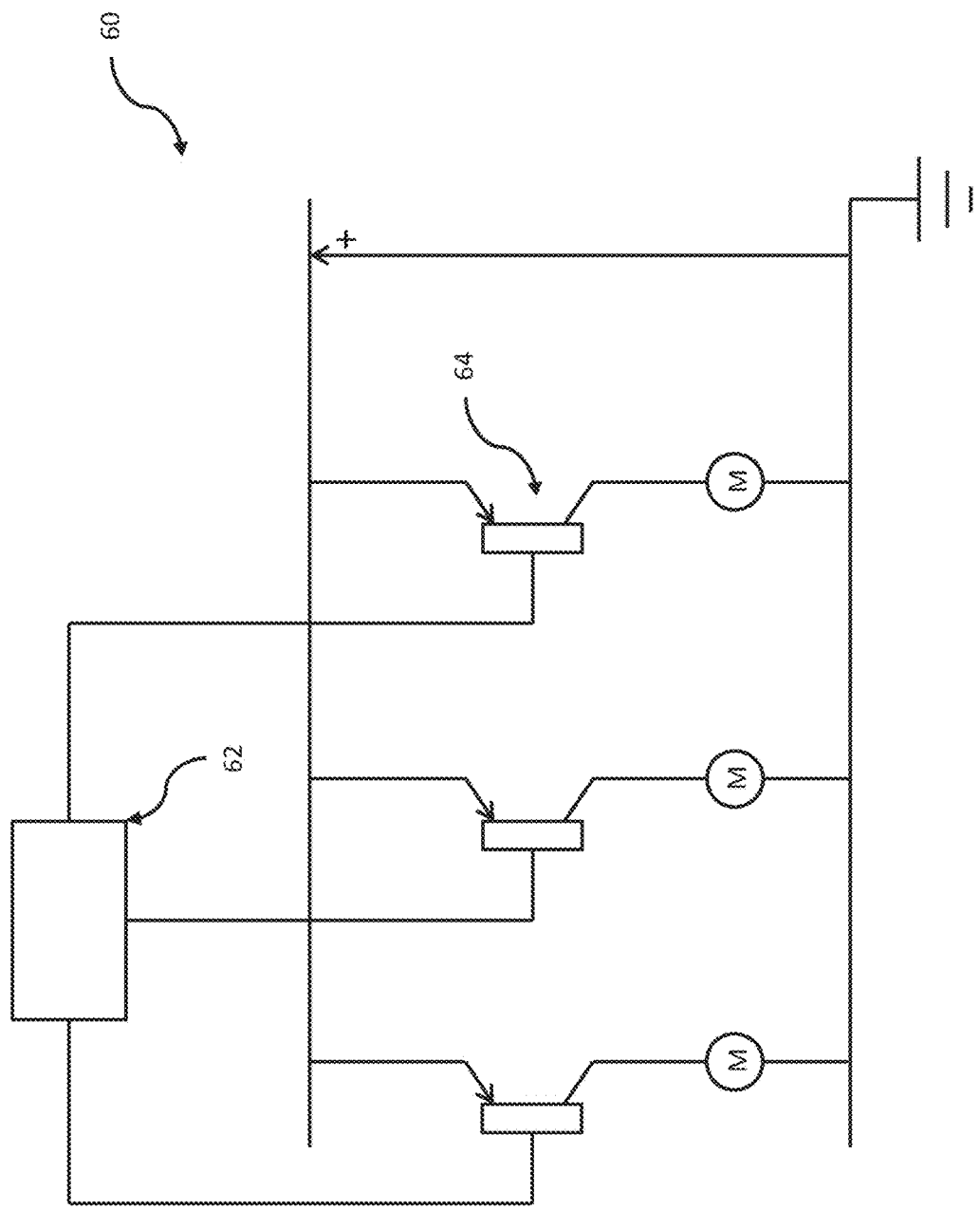
FIG. 5 is a schematic diagram of a circuit for operating the motor of FIG. 2.

Rods 24, 26 covered by windings 28 of each pole element segment 18A-18I may be selectively excited by a circuit including an electromagnetic coil in the manner depicted in FIG. 5. In one embodiment, a three-phase DC power circuit 60 includes a controller 62 that provides activation signals to the gates of switches 64, which in turn provide power to one of rollers 14A-14C or pole element segments 18A-18I. Circuit 60 may also employ pulse-width-modulation or, alternatively, gradually vary the gain to provide pseudo-sine wave power forms. In one embodiment, bipolar junction transistors are used as switches 64, but any of a variety of switch configurations may be used.

Rollers 14A-14C, which function as a rotor, may be attracted from pole element segment 18A-18I to pole element segment 18A-18I without changing the magnetic polarity of the rollers 14A-14C, thereby decreasing hysteresis and enabling the use of solid ferromagnetic rollers. This design may enable three-phase operation without the use of a transistor H-bridge. Three-phase unipolar operation may be controlled by three switches at a single level, rather than six switches typically necessary for generating three-phase bipolar operation. A 1-3, 2-6, 9-3 or 12-4 (12 pole elements and 4 rollers) motor may be operated bi-directionally using three line inputs. A 2-1, 4-2, 8-4 motor may be driven bi-directionally using two-phase, half step operation or quasi one-phase excitation.

In certain embodiments as described below, one or more of the magnetic components may travel eccentrically or elliptically, similar to the planetary gears revolving around a ring gear or balls revolving between the inner and outer race of a bearing, to provide a varying air gap during operation. In this manner, one machine may be able to produce the performance of a conventional gearbox/electric motor combined system while decreasing the total system volume and electromagnetic reluctance. The ability to directly generate a desired torque or RPM from electromagnetic operation enables direct electric motor drive shaft torques up to several hundred times conventional motor performance for a given size, volume, and weight, or drive shaft RPMs up to several hundred times conventional RPMs for a given electromagnetic switching rate and pole geometry.

In various embodiments, the present disclosure may enable direct electromagnetic operation of a rolling element bearing, such as a ball bearing, a linear mechanical transmission, such as a rack and pinion, a radial mechanical transmission, such as a planetary gear set, a belt drive, such as a ferromagnetic chain belt drive, or a fluid pump, such as a rotary vane pump, gear pump, scroll pump or cycloidal pump. One of skill in the art having the benefit of the present disclosure may design configurations that directly drive isolated rolling elements in sealed systems. While this strategy may suffer from some flux leakage, it may enable rolling elements to be driven in sanitary, isolated systems under high torque operation. In the case of a fluid pump, the electromagnetic pole segments may be connected via a ferromagnetic or non-ferromagnetic material, resulting in an isolated chamber that limits flux and fluid leakage.

In certain embodiments, each roller 14A-14C of the present disclosure may be spherical, such as a ball bearing, cylindrical or ellipsoidal, such as a roller or needle bearing, rigid, such as a spur gear or helical gear, flexible or deformable, in the case of a ferromagnetic timing belt or a strain wave gear, cycloidal, in the case of a gear pump, or non-spherical, in the case of a non-spherical gear train. Contact surface 48 of rollers 14A-14C and contact surfaces 34, 36 of races 30, 32 may be smooth as shown in the figures, such as a roller bearing, textured randomly, such as an electromagnetically driven grinding wheel, or periodically textured, such as gear teeth in a helical gear. All of these characteristics are referred to herein as "surface features."

As described in multiple embodiments below, an electromagnetically driven roller (or rotor) may enable torque densities several orders of magnitude greater than a traditional electric motor while still maintaining high efficiency. In these motor designs, a single large roller may be eccentrically excited by a stator to produce torque densities over 100 times that of a conventional electric motor of similar size and weight. Typical industry standards for conventional eccentric cycloidal gear trains are up to 119:1 at 93% efficiency, and strain wave gears may enable over 320:1 relative torque densities. Direct electromagnetic operation of the cycloidal gear utilizing aspects of the present disclosure would enable superior performance for a given size and weight over conventional systems. As is further described below, in various embodiments gears or other engagement elements may be coupled to a stator and/or a rotor (or two rotors) to provide contact that transfers or generates torque, while the gap between the stator and the rotor (or two rotors) remains non-zero, but changing during operation.

In the case of a strain wave gear, an electromagnetic field may directly generate rotation of a ferromagnetic spine wave with or without the use of a wave generator. If the wave generator is also ferromagnetic or partially ferromagnetic with a low friction liner, a second rotational speed may result from the same electromagnetic pole operation, resulting in a high torque low RPM output that may be used for control or traction, and a lower torque, higher RPM output that may be used to drive a fan for motor cooling. In this manner, the present disclosure enables directly driving two or more shaft speeds and torques (e.g., drive shafts 56, 58) from the same electromagnetic operation. Similar functionality may be realized in planetary gear systems, where a high torque output may be generated by the planetary gears and a low torque high RPM output may be generated in the sun gear. A ball bearing may similarly be driven with a changing magnetic field wherein the field either transcends though the inner race to a ferromagnetic core, or one race comprises electromagnetic poles and the other one comprises at least one permanent magnet or induced magnetic field. In either case, the ball bearings serve as ferromagnetic rolling elements to directly transmit the magnetic field using a varying air gap.

In the various embodiments of the present disclosure, the ferromagnetic rollers 14A-14C may be a solid ferromagnetic material, such as steel or ferrite, or may have a ferromagnetic surface with a non-ferromagnetic core, such as a hollow steel gear or steel lined aluminum core. This may enable lower weight and/or provide an electrical conductor to carry an induced electric current.

Figure 26:
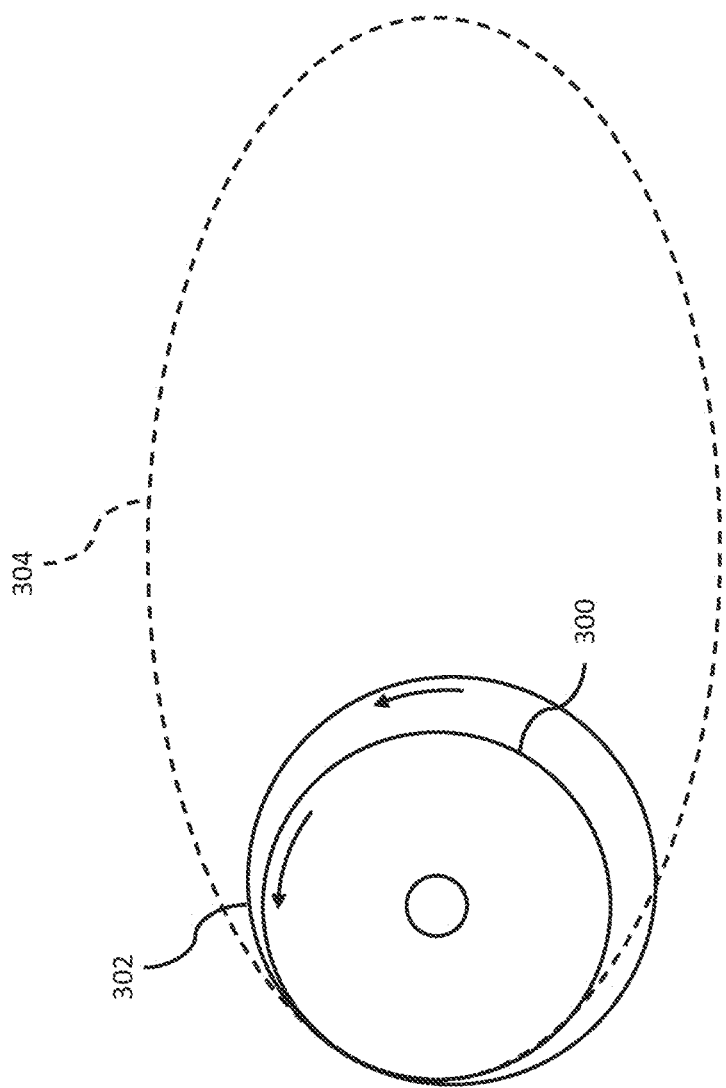
FIG. 26 is a conceptual view of an alternative motor design according to the present disclosure.

Another embodiment of the present disclosure may use multiple rollers 14A-14C that may be electromagnetically excited either directly in the case of slip rings or commutator rings, or indirectly via non-contact mechanisms, such as inductive coils. In this case, one or more of the rollers 14A-14C may be electromagnetically excited and may produce work, thereby eliminating a traditional stator. For example, two rollers may be held on shafts such that the surfaces roll as depicted in FIG. 26. Both roller 300 and roller 302 rotate. FIG. 26 also shows that one of the rollers (alternative roller 304) may be eccentric, or formed by a belt, a chain or other structure. One has permanent magnets, and the other may be selectively excited by commutator rings. This would directly generate torque from two rollers rather than one roller and one stationary element. If the rollers are interlocking, one may drive the system and the other may be free spinning. In certain embodiments, the rollers may also be different relative sizes. For example, a small driver and a big idler.

The above-described embodiment is a version of the present disclosure where two rolling elements (or rollers) directly drive each other without any stationary element. One practical application of this device would most likely comprise a small roller with a plurality of pole elements that may be selectively excited using conventional means, and a large crown gear or ring gear (similar to the starting motor/gear of a car engine or crown gear on a cement mixer). In this embodiment, both elements may be free to rotate counter to each other. The advancing electromagnetic field causes the leading edges of both elements to attract each other and roll. The surface of the rolling elements may be convex to convex, concave to convex, or non-spherical such as two square gears rolling over each other.

In another embodiment of the present disclosure, rollers 14A-14C may directly generate work by processing material between them and may be used to produce an electromagnetically driven ball mill or roller mill. Rollers 14A-14C may be orderly, as in the case of a ball and race mill or roller mill, or disorderly, in the case of a bulk ball mill with a substantial ball fill.

A ferromagnetic element of the present disclosure may comprise a solid ferromagnetic material, such as iron, iron alloy, iron oxide, or iron powder composite, or a planar ferromagnetic material, such as laminated steel. These materials may be patterned using conventional methods, such as machining, die stamping, or laser cutting, and may be assembled as needed using conventional methods, such as welding.

A rolling element electric motor/generator 10 may be driven using conventional electric drivers and may transmit mechanical power using conventional methods as described above. Operation using conventional drivers may require greater parallel wiring than conventional methods to decrease the total system current and compensate for the increased back EMF.

To further enhance the efficiency of motor 10, a dry lubricant, such as WS2, MoS2, or graphite, or a viscous lubricant, such as motor oil, may be used to decrease the coefficient of friction between stator 12 and rotor 14 surfaces. WS2 may be particularly well suited for this application due to its high load performance, ability to operate in oxidative environments, relatively thin lubricious layer (often less than one micron), and its relatively low coefficient of friction (less than 0.03). A dry lubricant may also enable the use of a relatively soft ferromagnetic core material by lubricating, and even embedding itself into the contact surfaces of the ferromagnetic material; thereby, forming an impregnated surface composite.

Ferromagnetic lubricants, such as ferro-fluids, ferromagnetic surface coatings, such as cobalt plating, or surface treatments, such as boriding, that may produce ferromagnetic compounds may be used to decrease rolling friction and increase surface hardness. Hard ferromagnetic coatings may also support low surface roughness, mechanical polishing and lower relatively frictional operation. These materials may be coated or added to the system using conventional methods.

Figure 27:
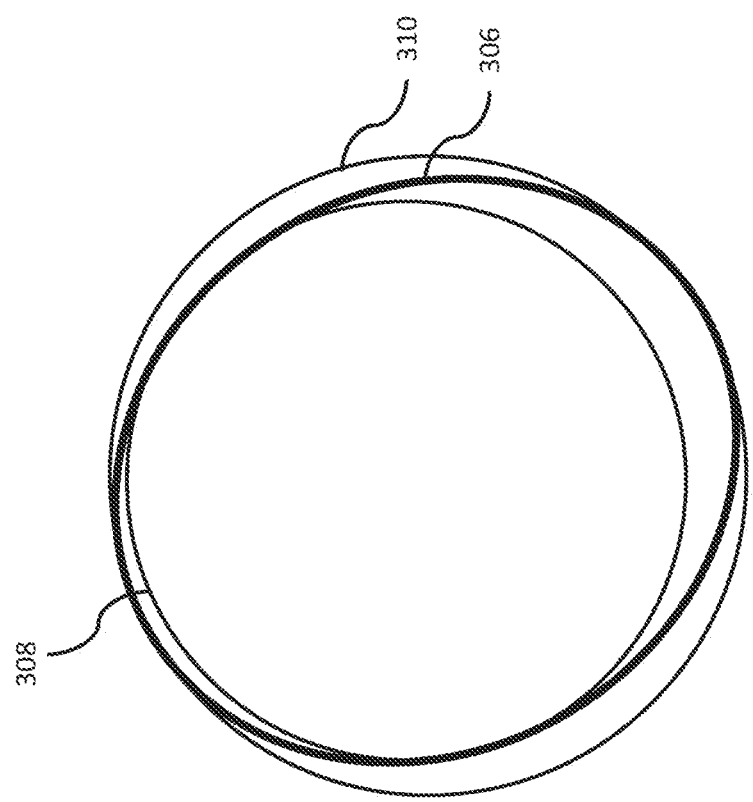
FIG. 27 is a conceptual view of another alternative motor design according to the present disclosure.

In other embodiments, a non-magnetic liner may be placed between the rollers 14A-14C to isolate the environment as depicted in FIG. 27. As shown, a non-magnetic liner 306 of the kind described below is positioned between one magnetic component 308 and the other magnetic component 310. A non-ferromagnetic liner may be plastic, such as polytetrafluoroethylene or polyoxymethylene, metallic, such as hard chrome or titanium plating, ceramic, such as CrN or TiN, or organic, such diamond-like-carbon (DLC). The liner may be thin and conform to the surface, such as an electroplating or coating, or may be thick and structural, such as metal core plastic or a strain wave-like ring of resilient material or otherwise as depicted in FIG. 27. Depending upon the embodiment, liner 306 may decrease friction between components 308, 310 or increase friction to create torque. While a non-ferromagnetic liner introduces an air gap resulting in a decrease in the relative permeability of a magnetic circuit, it may also decrease friction, improve component longevity, and/or provide an isolated aseptic environment that may be preferred for particular applications, while still enabling relatively high torque production directly through electromagnetic excitation of a roller 14A-14C. In certain embodiments, both rollers 14A-14C and pole element segments 18A-18I may be coated, or one may be coated. Such embodiments may employ a fluid lubricant and/or a hardened low friction surface coating such as DLC or CrN to decrease wear on otherwise mechanically soft components. These coatings would most likely be only microns thick, and thereby still permit zero air gap operation.

Figure 6A:
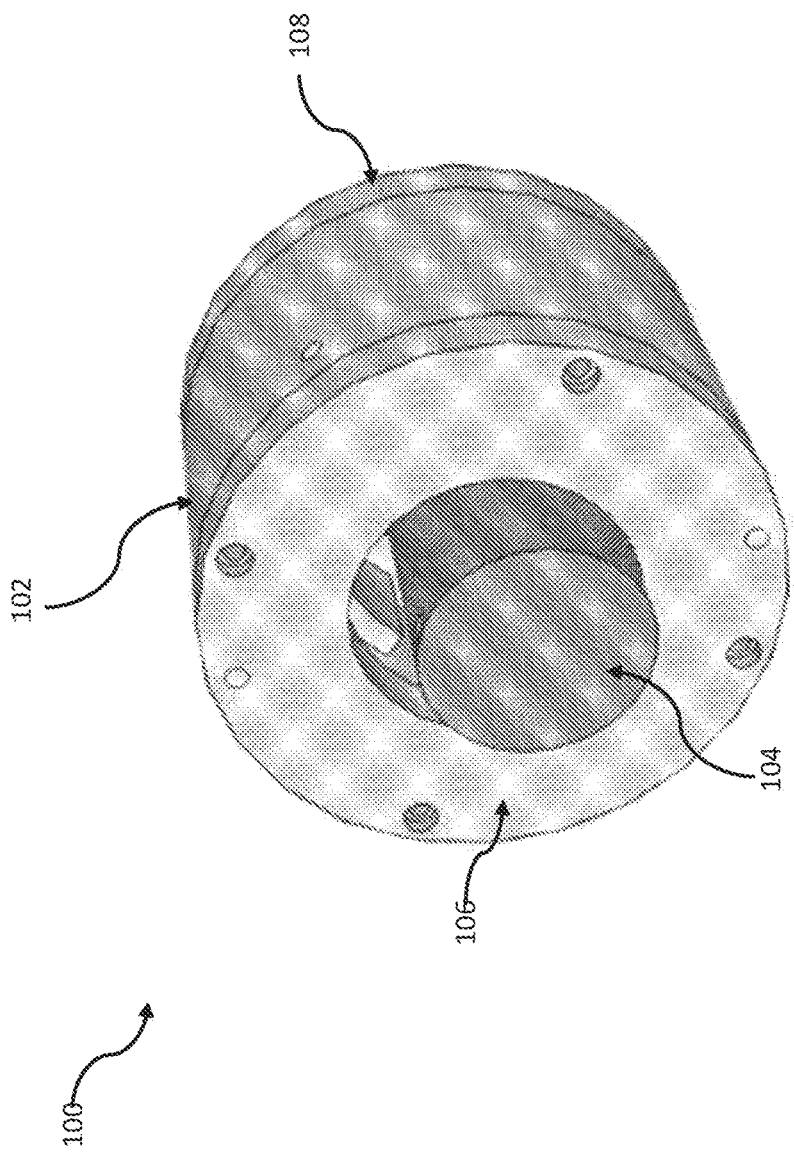
FIGS. 6A-C are perspective views of one embodiment of an electric motor according to the principles of the present disclosure.
Figure 6B:
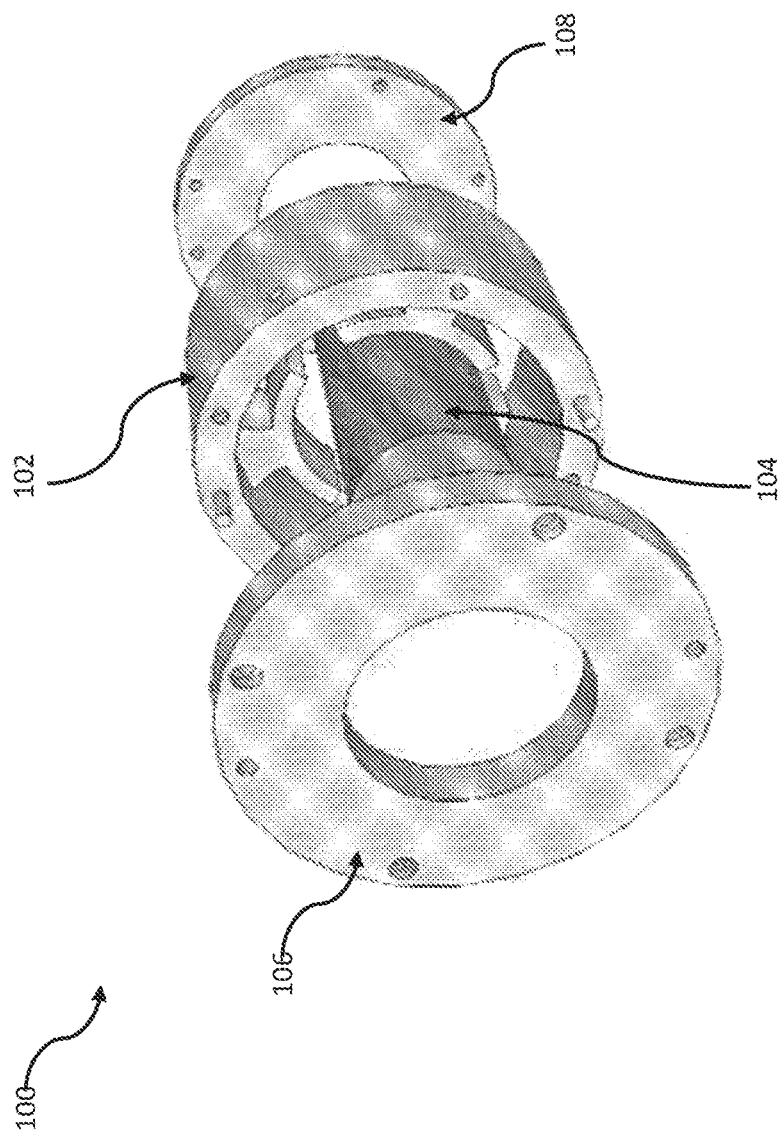
Figure 6C:
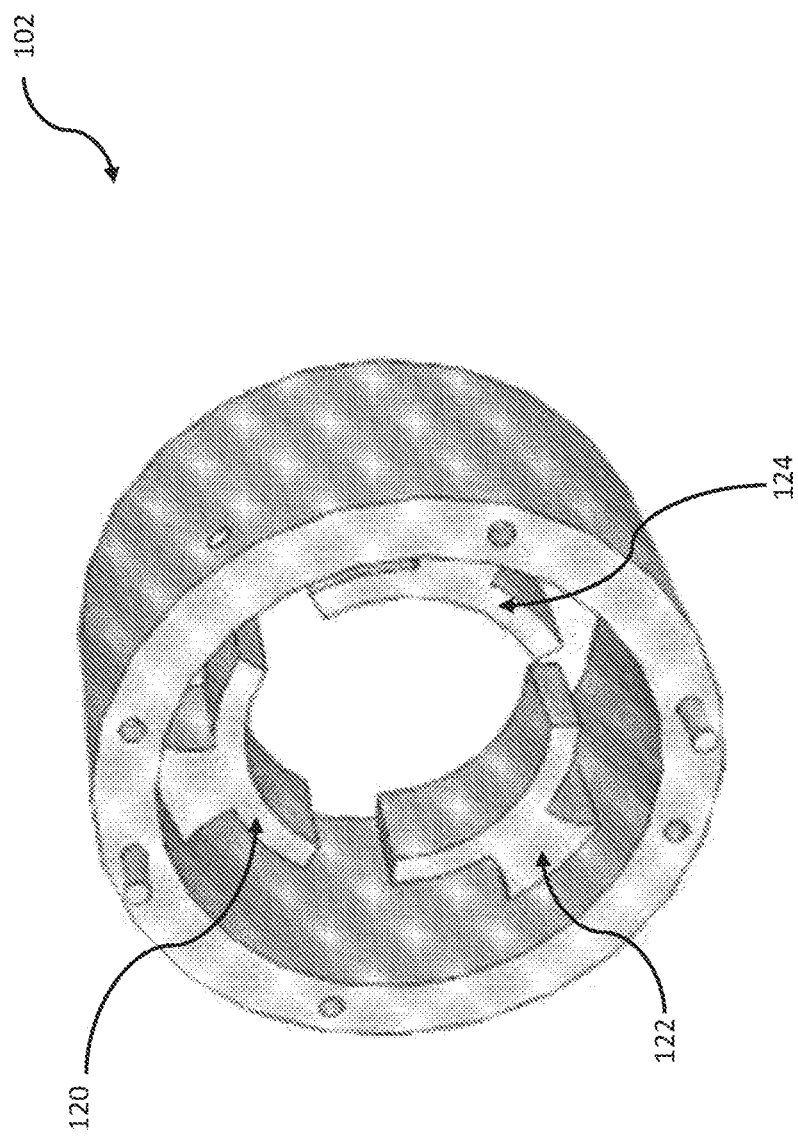
Figure 7A:
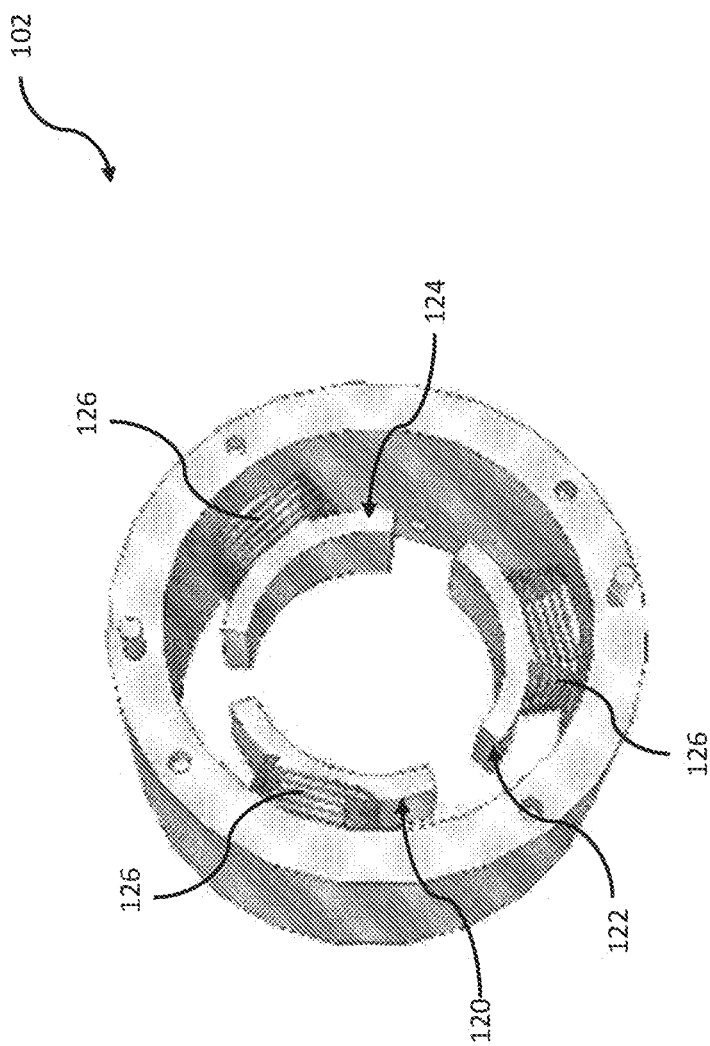
FIG. 7A is a perspective view of a stator according to the present disclosure.

Another embodiment of an electric motor according to the present disclosure is depicted in perspective views in FIGS. 6A-C, showing the motor's stator and rotor elements. Motor 100 generally includes a stator 102, a rotor 104 and a pair of end caps 106, 108. Both stator 102 and rotor 104 are made of ferromagnetic material. While FIG. 6A shows each component of motor 100 as a single unit, FIG. 6B highlights each component separately, i.e., front cap 106 and end cap 108 along with the main stator body 102. Stator 102 is comprised of three poles 120, 122, 124, as seen in FIG. 6C, where a synchronized magnetic flux is generated in order to guarantee continuous movement. Each stator pole 120, 122, 124 is wrapped by windings 126 for magneto-motive-force (MMF) generation, as shown in FIG. 7A.

Figure 7B:
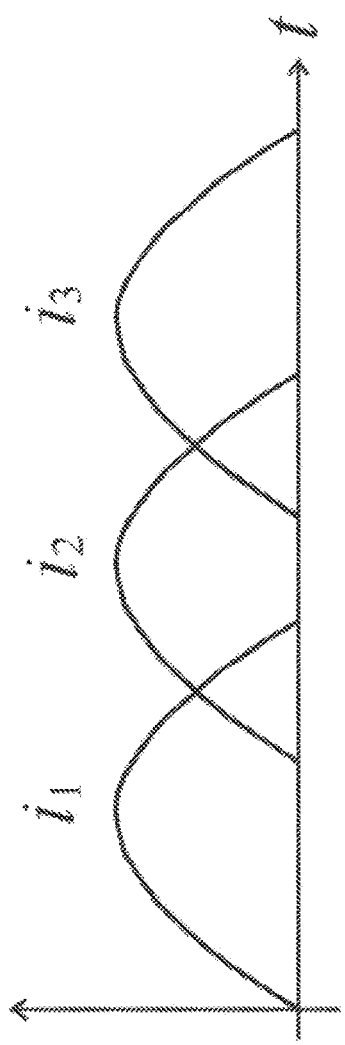
FIG. 7B is a graph of current provided to the stator of FIG. 7A to provide continuous movement of a rotor.

Referring now to FIG. 7B, note that when the current $i_1$ is applied to the stator pole 120, its flux will attract rotor 104. When $i_1$ reduces while $i_2$ increases, rotor 104 will roll over stator 102 towards stator pole 122. The profile of the currents presented in FIG. 7B will guarantee continuous movement of rotor 104. FIG. 7C, in turn, shows a sequence of snap shots that demonstrates how motor 100 operates. From the left to the right, FIG. 7C shows a specific situation where rotor 104 rolls in a clockwise direction within stator 102.

Figure 8:
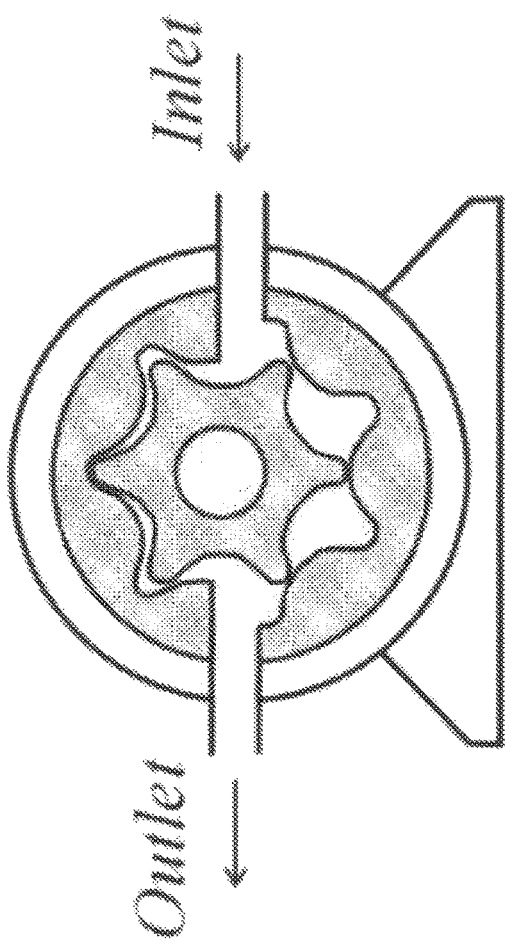
FIG. 8 is an end view of a conventional hydraulic motor.

It is noteworthy to mention that the rotation created by motor 100 is similar to the rotation created by hydraulic motors, as seen in FIG. 8. Both types of motors have a rigid body rotor with combined translational and rotational movements. Hydraulic motors, however, have a significantly different characteristic in that there must be contact at various locations between the components to isolate chambers of fluid having different pressures. Motors according to the present disclosure may operate without contact between the magnetic components as described herein.

Figure 9A:
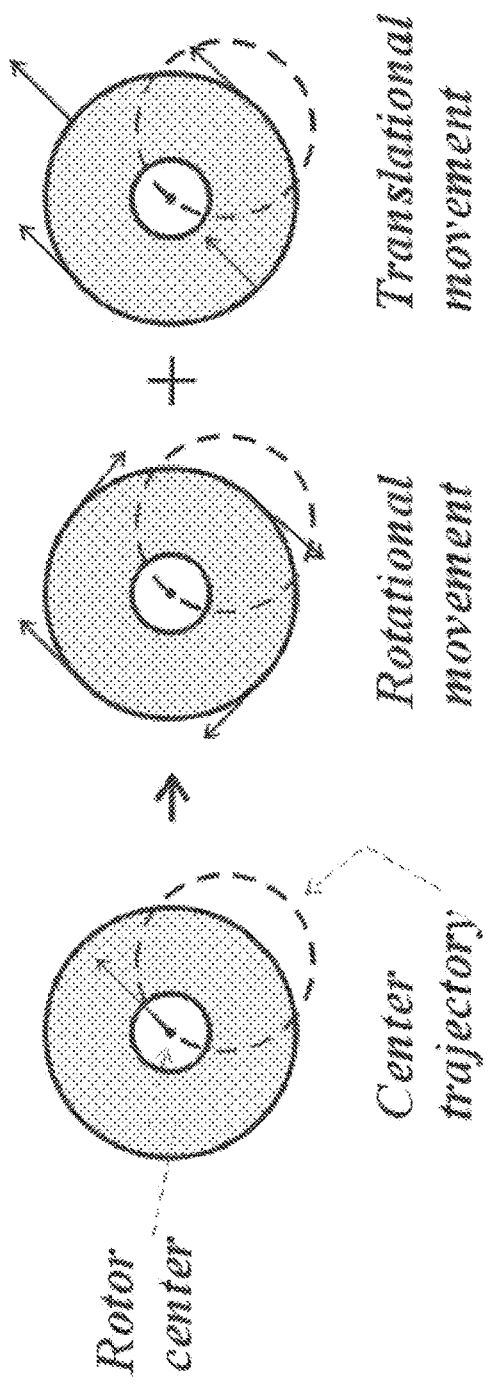
FIG. 9A provides conceptual views of the combined translational and rotational movement of a rotor according to the present disclosure.
Figure 9B:
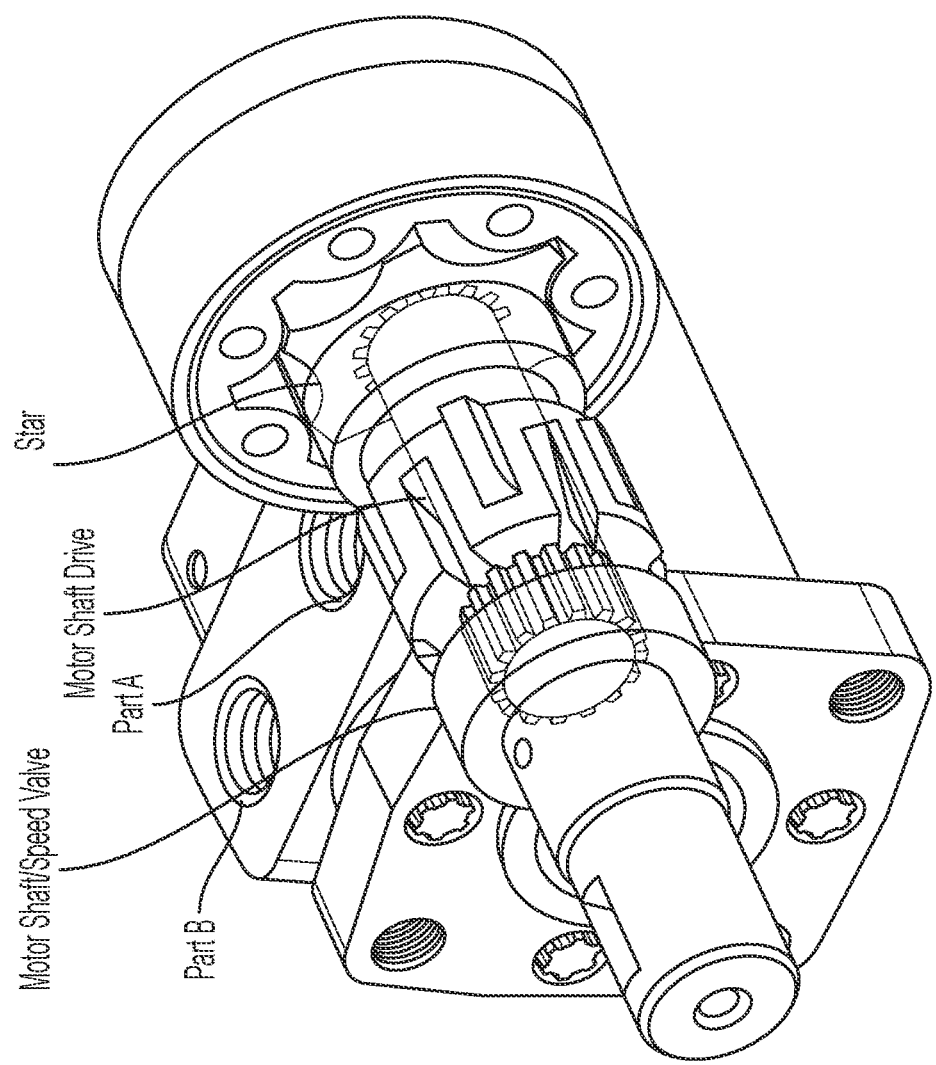
FIG. 9B is a perspective view of a gearbox employing a motor according to the present disclosure.

FIG. 9A presents the trajectory of the center of rotor 104 of motor 100 and depicts how movement of rotor 104 can be obtained by a combination of rotational and translational movements. As is further described below, a mechanical gear can be used to convert this combined translational and rotational movement into rotational movement only as necessary for a specific application (see FIG. 9B). This type of gear box is also used in hydraulic motors.

Motor Modeling

Figure 10:
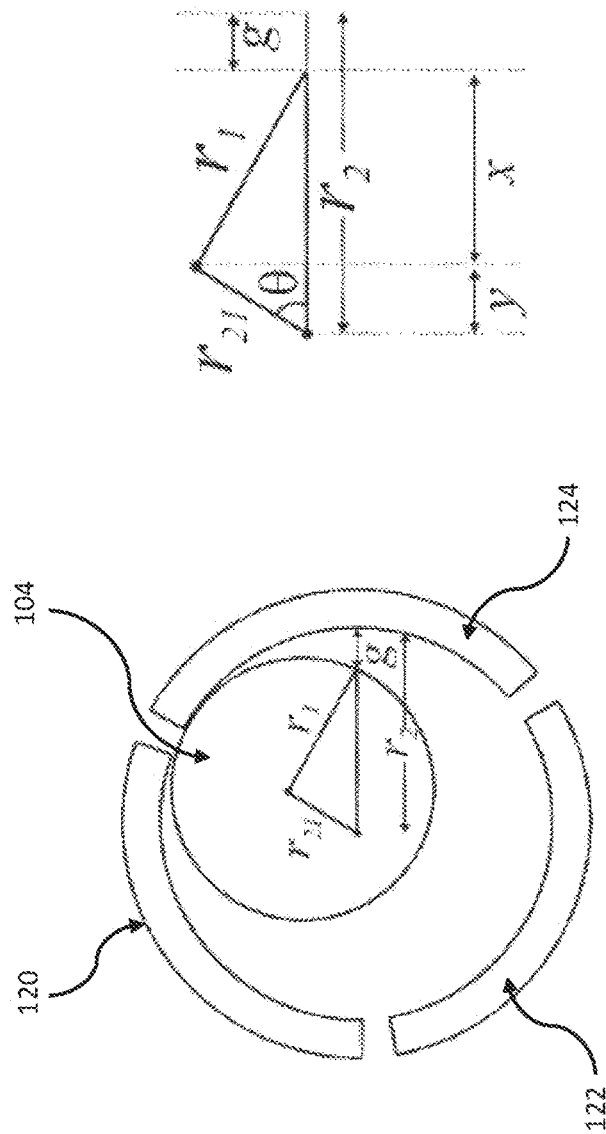
FIG. 10 provides conceptual views of the geometric approach used to derive the air gap of motors according to the present disclosure.

As a rotor according to certain embodiments of the present disclosure spins following the stator pole excitation, its center spans a circle as described in FIG. 9A. Due to this movement, the gap between the stator and rotor changes as a function of the angular position of the rotor ($\theta$). The flux travels in a path that is normal to both the stator and the rotor, and in this geometrical configuration is expected to fringe slightly. To simplify the initial derivation for an expression of the gap, only a path normal of the stator is considered, which is reasonable if the rotor radius is close to the stator radius. Notice from FIG. 10 that the air gap expression [$g(\theta)$] can be written as a function of angular position $\theta$. The expression for the gap can be therefore derived as shown below:

$$g(\theta) = r_2 - r_{21}\cos(\theta) - \sqrt{(r_1^2 - r_{21}^2 \sin^2(\theta))} \tag{1}$$

where $r_1$, $r_2$, and $r_{21}$ are the radius of the rotor, stator, and the difference between both radius (i.e., $r_{21} = r_2 - r_1$), respectively.

Figure 11:
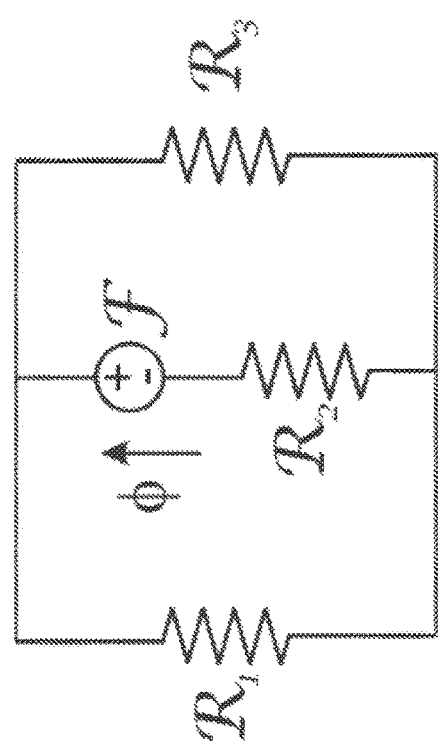
FIG. 11 is a schematic diagram of a magnetic equivalent circuit of the motor depicted in FIGS. 6A-C when only one pole is supplied with activation current.

The magnetic equivalent circuit of this motor, when only one pole is supplied with current can be modeled as shown in FIG. 11, in which $R_1$ and $R_3$ are the reluctances associated with the gaps at the front and back caps of this motor and $R_2$ is the gap associated with the pole of the stator.

If the reluctance of the magnetic core is neglected and only the reluctance of the air gap is considered, the self-inductance of the device can be expressed as a function of the angle as well, which leads to:

$$L = N^2 / R_T \tag{2}$$

in which N is the number of turns for the stator pole and $R_T$ is the total reluctance seen by the flux ($\phi$) in the circuit shown in FIG. 11. This reluctance can be calculated as shown below:

$$R_T = (R_1 \| R_3) + R_2 \tag{3}$$

where: $R_1 = g/\mu_0 A_{g1}$, $R_2 = g/\mu_0 A_{g2}$, and $R_3 = g/\mu_0 A_{g3}$. Also, $A_{g1}$, $A_{g3}$, and $A_{g2}$ are the areas associated with front cap, back cap, and the stator pole, respectively.

Figure 12A:
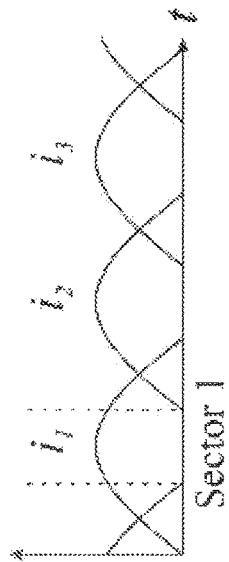
FIGS. 12A-D provide developed diagrams of an electric motor according to the present disclosure.
Figure 12B:
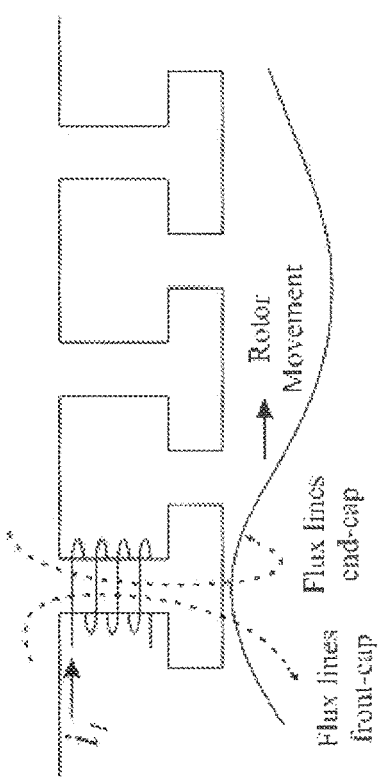
Figure 12C:
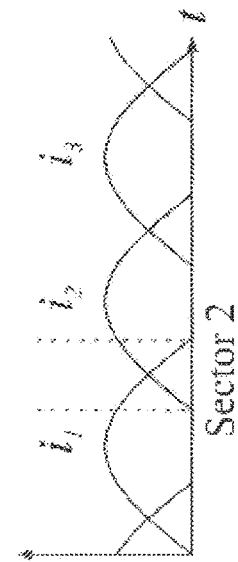

FIGS. 12A-D collectively provide a developed diagram of electric motor 100. In the figures are shown a sequence of shots as the rotor spins to highlight two different scenarios in terms of rotor positioning and stator current values. For instance, FIG. 12A shows a rotor position when the currents are in sector 1 as presented in FIG. 12B. In this sector, the currents in poles 2 and 3 are zero ($i_2 = i_3 = 0$), which eliminates the mutual inductances with respect to pole 1. Therefore, the self-inductance $L_{11}$ is defined using (2).

Figure 12D:
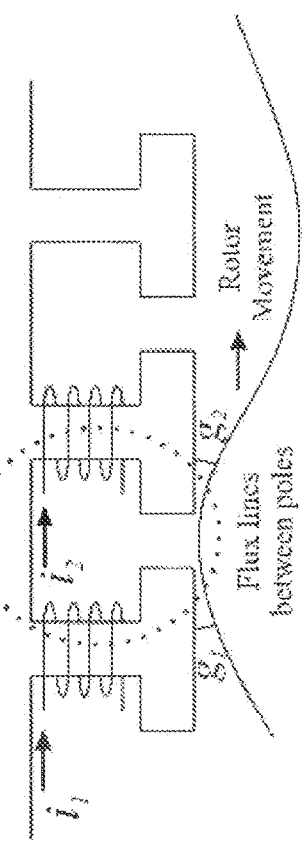

Note that flux lines created at pole 1 go to the front cap and back cap completing an E-core as seen in FIG. 1. In sector 2 as shown in FIG. 12D, current $i_1$ decreases while $i_2$ increases, which lead the rotor to rotate to the right (see FIG. 12C). During this interval of time, in addition to the flux lines presented in FIG. 12A, there are also flux lines that cross both poles 1 and 2 through the rotor.

As the rotor moves further right, the same flux behavior is observed for poles 2 and 3 in a cyclic way. As is shown in equation (2), the inductance depends on the number of turns and the reluctance of the path. Reluctance of the gap is calculated in equation (3).

The area of the front cap ($A_{g1}$) is the same as the area of the back cap ($A_{g3}$) and it is considered as $A_g$ in the analysis presented herein. Assuming $r_1 \approx r_2$ in equation (1), this equation can be written as:

$$g(\theta) = r_{21}[1 - \cos(\theta)] \tag{4}$$

the self-inductances can be defined as $$L_{11} = 2N_1^2 \mu_0 A_{g2} A_g / r_{21}(1 - \cos(\theta))(A_{g2} + 2A_g) \tag{5}$$

$$L_{22} = 2N_2^2 \mu_0 A_{g2} A_g / r_{21}(1 - \cos(\theta - 2\pi/3))(A_{g2} + 2A_g) \tag{6}$$

$$L_{33} = 2N_3^2 \mu_0 A_{g2} A_g / r_{21}(1 - \cos(\theta + 2\pi/3))(A_{g2} + 2A_g) \tag{7}$$

The mutual inductances can be calculated as follows:

$$L_{12} = 2N_1 N_2 \mu_0 A_g A_{g2} / (g_1(\theta) + g_2(\theta))(2A_g + A_{g2}) \tag{8}$$

$$L_{13} = 2N_1 N_3 \mu_0 A_g A_{g2} / (g_1(\theta) + g_3(\theta))(2A_g + A_{g2}) \tag{9}$$

$$L_{23} = 2N_2 N_3 \mu_0 A_g A_{g2} / (g_2(\theta) + g_3(\theta))(2A_g + A_{g2}) \tag{10}$$

in which: $g_1(\theta) = r_{21}[1 - \cos(\theta)]$, $g_2(\theta) = r_{21}[1 - \cos(\theta - (2\pi/3))]$, and $g_3(\theta) = r_{21}[1 - \cos(\theta + (2\pi/3))]$.

The torque can be calculated as:

$$Te = \partial wc / \partial \theta \tag{11}$$

Using expressions (5)-(11), the expression of the torque is as shown in equation (12), $$T_e = -\frac{r_{21}\sin(\theta)k1}{(r_{21}-r_{21}\cos(\theta))^2} - \frac{r_{21}\sin\left(\theta-\frac{2\pi}{3}\right)k2}{\left(r_{21}-r_{21}\cos\left(\theta-\frac{2\pi}{3}\right)\right)^2} - \frac{r_{21}\sin\left(\theta+\frac{2\pi}{3}\right)k3}{\left(r_{21}-r_{21}\cos\left(\theta+\frac{2\pi}{3}\right)\right)^2} + \frac{4r_{21}\sin\left(\theta+\frac{2\pi}{3}\right)k4}{\left(2r_{21}-r_{21}\cos\left(\theta+\frac{2\pi}{3}\right)\right)^2} + \frac{4r_{21}\sin\left(\theta-\frac{2\pi}{3}\right)k5}{\left(2r_{21}-r_{21}\cos\left(\theta-\frac{2\pi}{3}\right)\right)^2} + \frac{4r_{21}\sin(\theta)k6}{(2r_{21}-r_{21}\cos(\theta))^2}$$ (12)

in which:

$k_1=(N^2\mu_0 A_{g2}A_g/(2A_g+A_{g2}))i_1^2$, $k_2=(N^2\mu_0 A_{g2}A_g/(2A_g+A_{g2}))i_2^2$, $k_3=(N^2\mu_0 A_{g2}A_g/(2A_g+A_{g2}))i_3^2$, $k_4=(N^2\mu_0 A_{g2}A_g/(2A_g+A_{g2}))i_1 i_2$, $k_5=(N^2\mu_0 A_{g2}A_g/(2A_g+A_{g2}))i_1 i_3$, and $k_6=(N^2\mu_0 A_{g2}A_g/(2A_g+A_{g2}))i_2 i_3$, Notice that since the number of turns are the same in poles 1, 2 and 3 (i.e. $N_1=N_2=N_3$), N has been considered as the number of turns in all equations above.

Experimental Setup

Figure 13A:
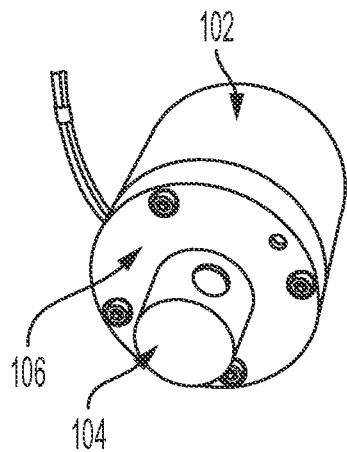
FIGS. 13A-D are photographs of an electric motor according to one embodiment of the present disclosure.
Figure 13B:
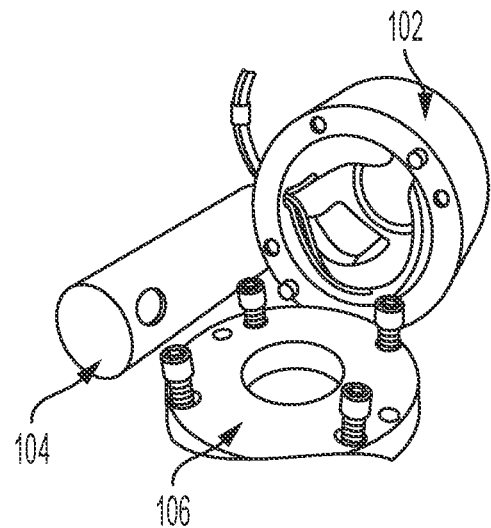
Figure 13C:
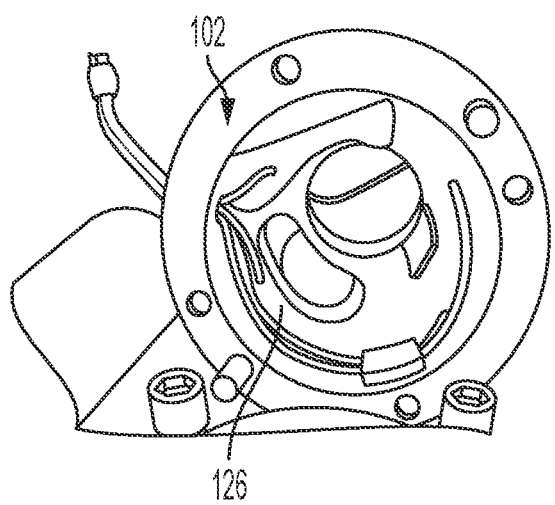
Figure 13D:
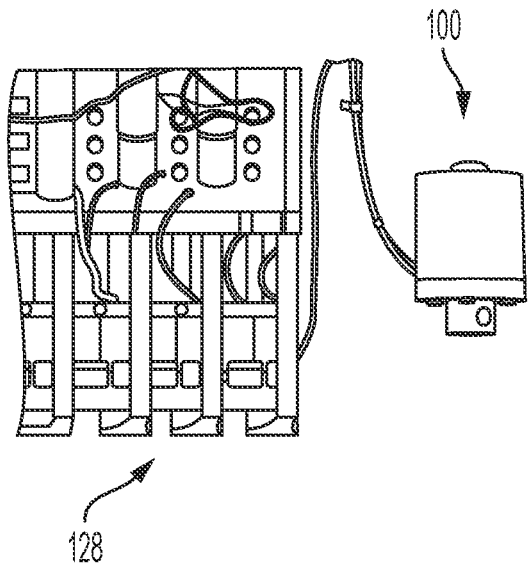

A proof-of-concept laboratory prototype was built to validate the theoretical assumptions. The material selected for this first prototype was low carbon steel 1018, which has magnetic flux density saturation of around 2 Tesla. Both stator poles and rotor are built with low carbon steel 1018. FIG. 13A is a photo of motor 100 in perspective and assembled as a single unit. FIG. 13B, in turn, depicts motor 100 with the front cap 106 removed from the stator body 102. Details about the internal pole structure and stator windings 126 are presented in FIG. 13C. Finally, FIG. 13D shows an upper view of motor 100 connected to a drive system 128, which is show schematically in FIG. 12.

FIG. 13E shows experimental results collected for zero air gap electric motor 100 depicted in FIGS. 13A-D. The profile of the current was implemented with a PWM control strategy operating in open loop. The top waveform presented in FIG. 13E is the current of pole 1, while the bottom one is the current of pole 2.

Figure 14:
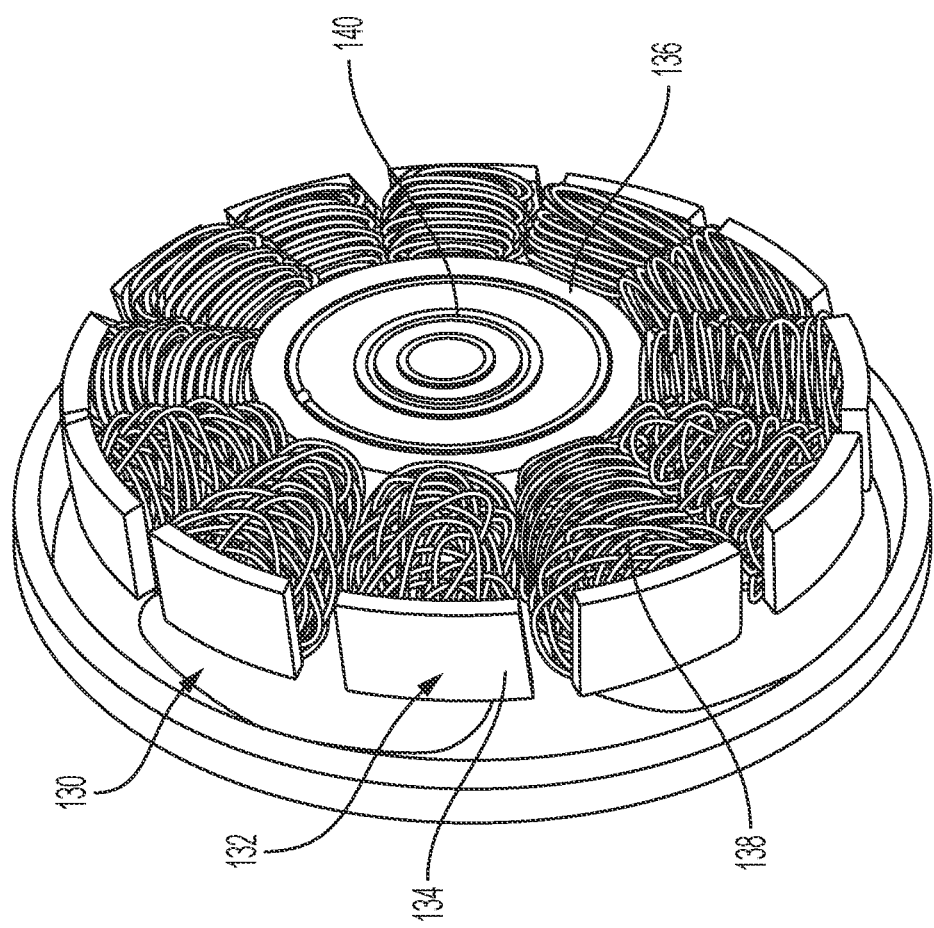
FIG. 14 is a photograph of a stator according to an alternative embodiment of the present disclosure.

Referring now to FIG. 14, an alternative embodiment of a stator for a motor according to the present disclosure is depicted. As shown, stator 130 generally includes twelve poles 132 arranged in an outrunner configuration such that the contact surfaces 134 of poles 132 are directed radially outwardly from a central axis. Each of poles 132 extend from a central ring 136 and include a plurality of windings 138. A bearing 140 is disposed within central ring 136 to support a drive shaft as is further described below.

The outrunner pole configuration of stator 130 is to be contrasted with the inrunner pole configuration described above with reference to FIGS. 6A-C, 7A and 7C. Stator 102 described above includes poles 124 that are directed radially inwardly from an outer ring, and accommodates an internal rotor 104. Either configuration is suitable for various applications of the present disclosure. The inrunner stator configuration may be preferred for higher RPM applications. More specifically, for a maximum gap width, an inrunner motor will need fewer cycles to complete a rotation, since the rotor diameter is smaller. The flux density across the surface will only rise to a certain point and then saturate, therefore, total force is proportional to surface area. An outrunner motor has greater surface area; however, for a given maximum gap width, the motor will have to cycle more times to complete a rotation. If maximum operating frequency and maximum air gap for an inrunner and outrunner are both held constant, the outrunner will generate higher torque, but at a lower RPM as compared to the inrunner.

Figure 15:
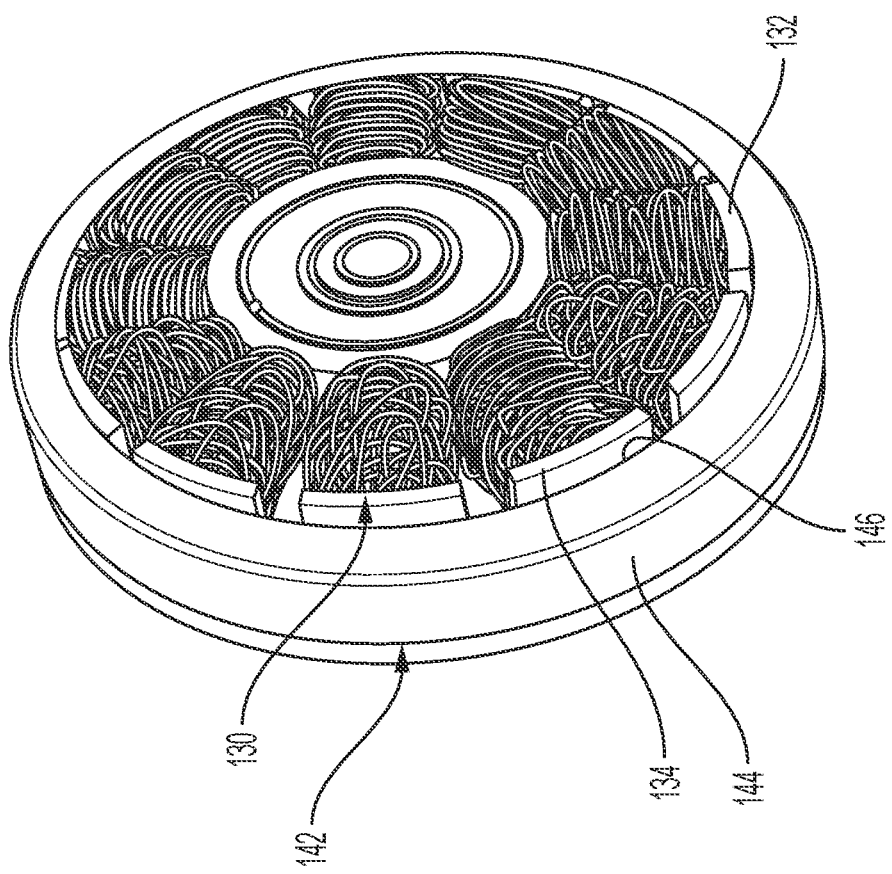
FIG. 15 is a photograph of a rotor mounted to the stator of FIG. 14.
Figure 15:
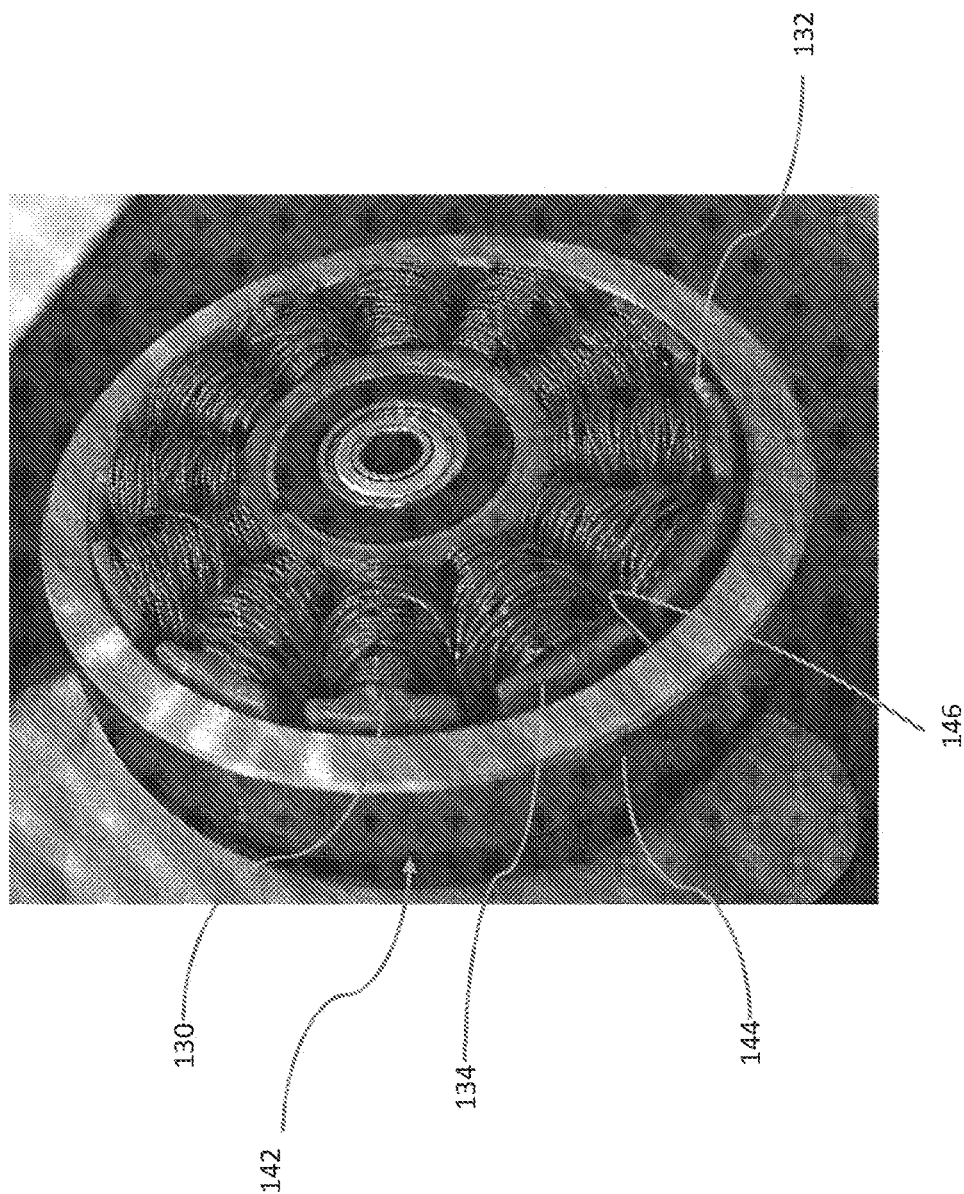

Referring now to FIG. 15, stator 130 of FIG. 14 is shown disposed within a cylindrical outer rotor 142 having a cylindrical side wall 144. As is described below, rotor 142 in certain embodiments includes a full or partial drive wall that extends from side wall 144 of rotor 142. Rotor 142 of FIG. 15 is provided primarily to depict the interaction between contact surfaces 134 of poles 132 and the inner contact surface 146 of rotor 142.

Figure 16:
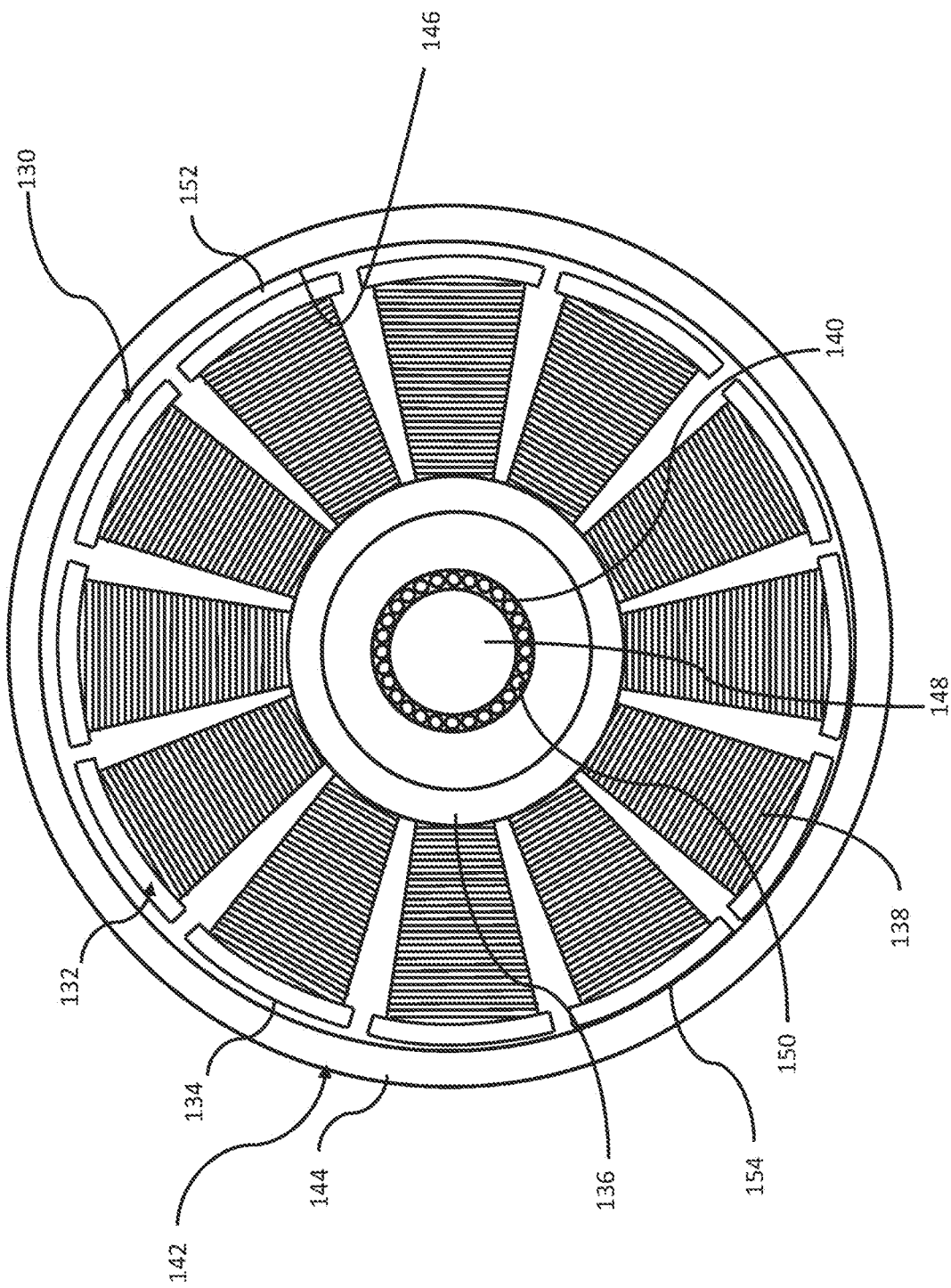
FIG. 16 is an end view of the stator and rotor of FIG. 15.

A more detailed diagram of the interaction between and details of stator 130 and rotor 142 is provided in FIG. 16. Again, in FIG. 16 the drive wall of rotor 142 is not shown for clarity. In FIG. 16 a drive shaft 148 is shown mounted within bearing 140. Drive shaft 148 can rotate freely relative to stator 130 within bearing 140, which includes, for example, a plurality of ball bearings 150. Other bearing configurations may be used. As shown, the diameter of inner surface 146 of side wall 144 of rotor 142 is larger than the diameter defined by the contact surfaces 134 of poles 132 of stator 130. As such, a gap 152 exists between contact surface 146 and most, but not all of contact surfaces 134. Because of the rolling, rotary motion of rotor 142 on stator 130, in this embodiment at least one of the contact surfaces 134 of poles 132 will always be in contact with contact surface 146. This contact is depicted at reference number 154 and, as described herein, is the minimum width of varying gap 152, which causes the rotary motion of rotor 142.

Poles 132 of stator 130 are arranged and activated as six bipolar pairs of poles. It should be understood, however, that the present disclosure contemplates other activation schemes including individually activating poles 132 or activating oppositely oriented partial pairs. The pairs are pulse DC activated without phase inversion, so the hysteresis loss is essentially zero. When a pole 132 is activated, the current through its windings 138 generates an electromagnetic force that draws contact surface 146 of rotor 142 into contact with contact surface 134 of the activated pole 132 such as is shown at location 154 in FIG. 16. When the adjacent pole 132 is activated (and the previous pole 132 is deactivated), contact surface 146 of rotor 142 is drawn into contact with the contact surface 134 of the adjacent pole 132. In this manner, poles 132 are activated such that rotor 142 rotates in a path about stator 130. As is further described below, this rotation can be used to drive rotation of drive shaft 148, which in turn may be used to power a load.

Figure 17:
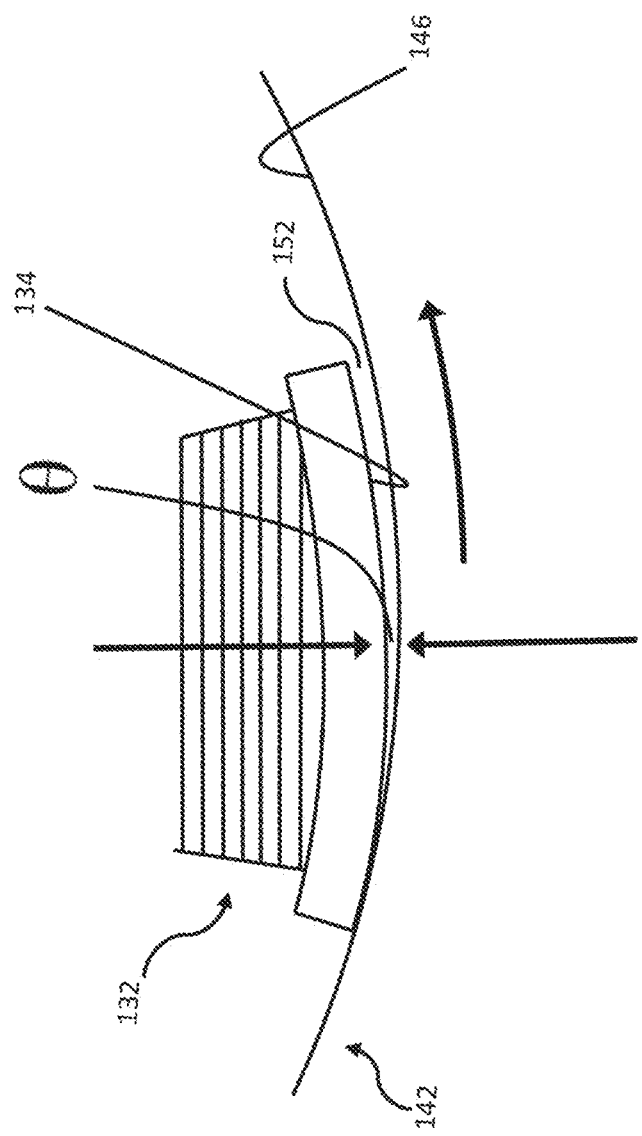
FIG. 17 is a conceptual diagram depicting the interaction between the stator and rotor of FIG. 16.

A smaller gap 152 between rotor 142 and stator 130 results in a lower rotation rate of rotor 142 and correspondingly higher output torque. As indicated by FIG. 17, the smaller gap 152 becomes (i.e., the closer the diameter of contact surface 146 of rotor 142 is to the outer diameter defined by contact surfaces 134 of poles 132 of stator 130), the closer the angle θ gets to zero. A motor having a larger gap 152, however, may be better suited for certain applications. With a larger gap 152, rotor 142 rotates to a greater extent per electromagnetic cycle of stator 130. While the larger gap 152 results in lower torque (because θ is larger), it also provides increased RPMs for the drive shaft 148, which may result in increased power (power=torque*RPM).

It should be noted that contact surface 146 of rotor 142 may be made of material selected to be deformable to increase the surface area of contact (i.e., friction) between contact surface 146 and contact surfaces 134. As should also be apparent to one skilled in the art having the benefit of this disclosure, a motor of the configuration described above has essentially zero wear, even though there is contact between rotor 142 and stator 130. This is because the contact is in the form of a rolling motion, not a sliding motion. Moreover, it should be understood that in the event of back drive (i.e., reverse torque from the load during braking), the present motor will not be damaged because rotor 142 can slide in a reverse direction on stator 130. This is to be contrasted with gear drives, for example, where back drive can result in damage to or destruction of the gear teeth. Using dissimilar materials in the stator and rotor may further reduce wear by preventing galling during rolling.

Figure 18:
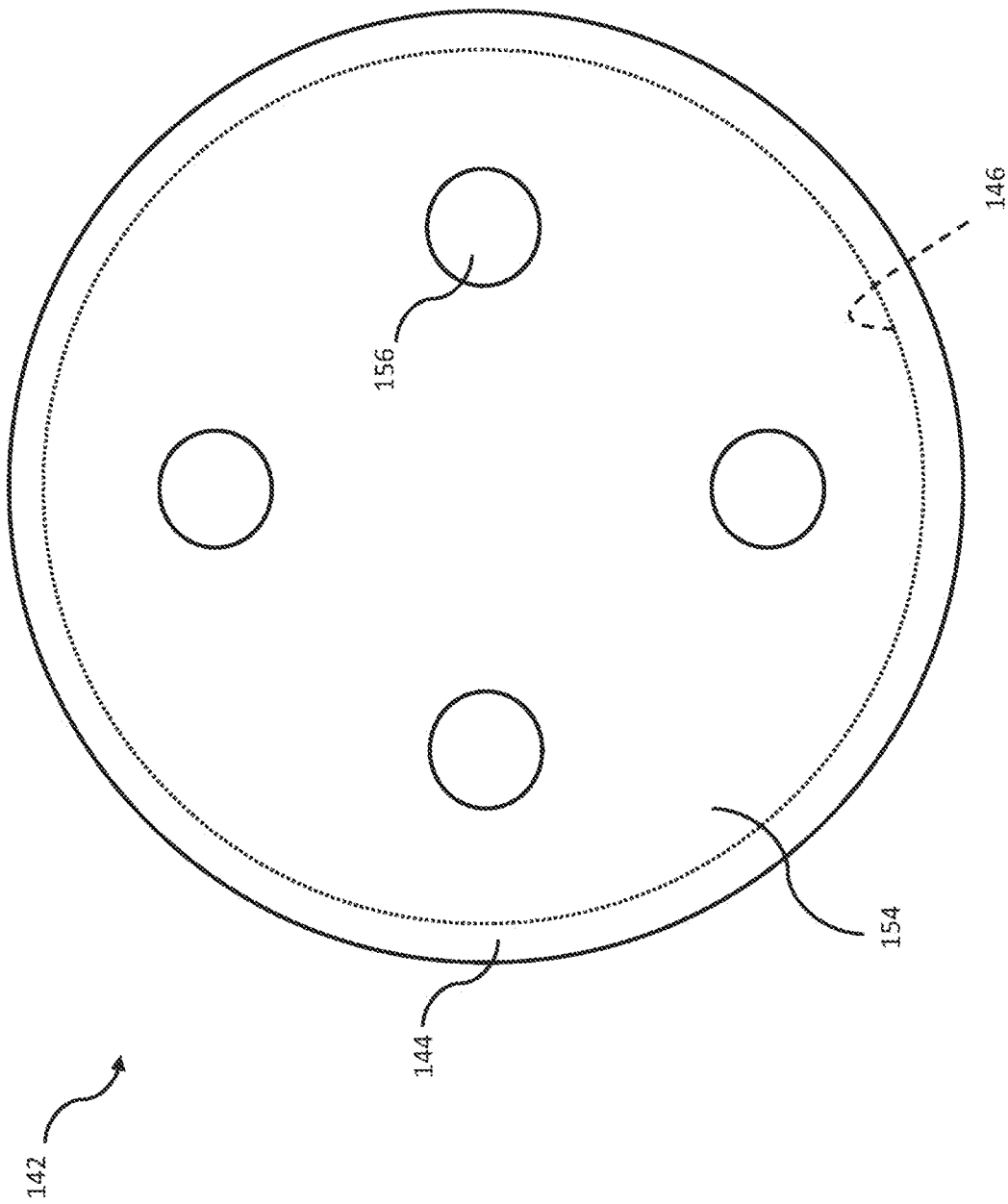
FIG. 18 is an end view of a rotor according to one embodiment of the present disclosure.
Figure 19:
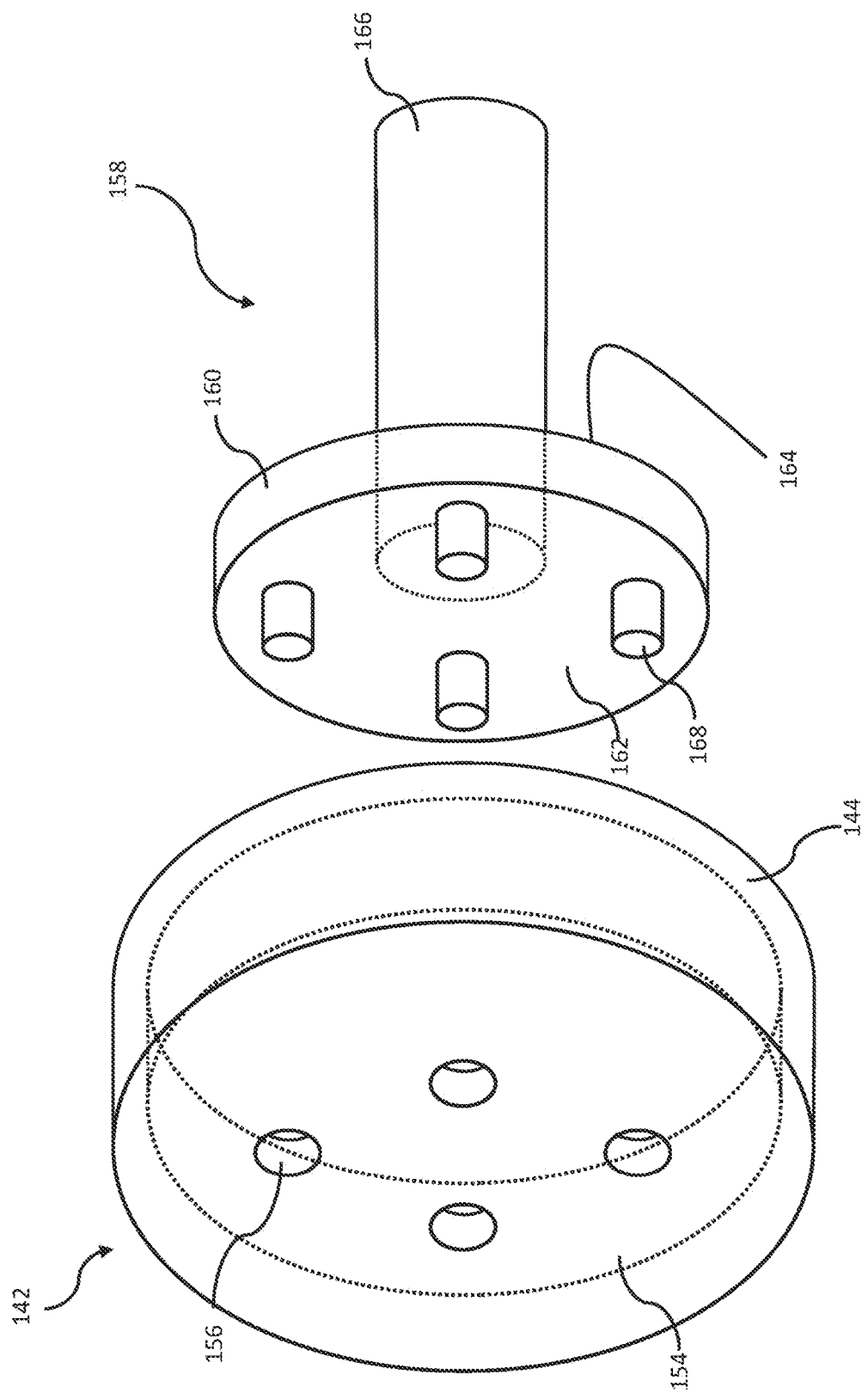
FIG. 19 is a perspective view of the rotor of FIG. 18 and a drive assembly according to one embodiment of the present disclosure.
Figure 20:
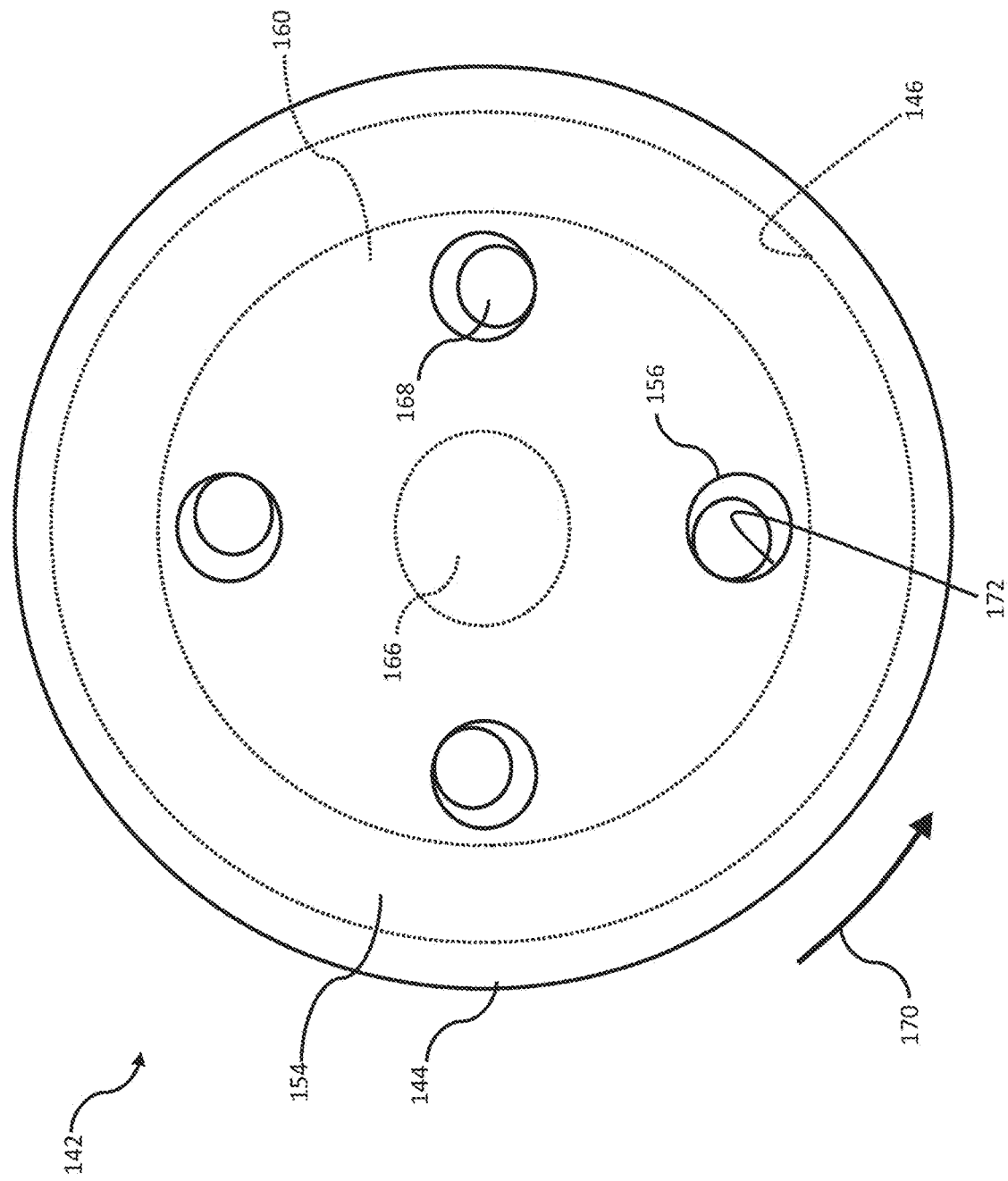
FIG. 20 is an end view of the rotor and drive assembly of FIG. 19.

Referring now to FIGS. 18-20, further details of rotor 142 of FIGS. 15 and 16 and a corresponding drive assembly are shown. In addition to cylindrical side wall 144 having contact surface 146, rotor 142 also includes a drive wall 154 that spans between side wall 144. Drive wall 154 includes a plurality of drive openings 156 that extend perpendicularly through drive wall 154 in a spaced arrangement. As explained below, drive openings 156 transfer the movement of rotor 142 to a drive assembly. While drive wall 154 is depicted as a substantially continuous web between side wall 144 (with the exception of drive openings 156), it should be understood that in various embodiments drive wall 154 may comprise a plurality of partial walls or projections from side wall 144, each or some having a drive opening 156. Alternatively, drive wall 154 may be a substantially continuous wall with drive openings 156 and a plurality of cut-outs for weight reduction. Other configurations are contemplated by the present disclosure.

Referring now to FIG. 19, drive assembly 158 according to one embodiment includes a drive plate 160 having an outer surface 162 and an inner surface 164. A drive shaft 166 extends perpendicularly from inner surface 164 of drive plate 160. A plurality of drive rods 168 extend perpendicularly from outer surface 162 of drive plate 160. Drive rods 168 are spaced on outer surface 162 to align with drive openings 156 of rotor 142. In an alternative embodiment, drive rods 168 may extend from the inner surface of drive wall 154 of rotor 142 and align with drive openings 156 formed through drive plate 160. Other couplings between rotor 142 and drive assembly 158 may be used.

As best shown in FIG. 20, drive rods 168 have a smaller diameter than the diameter of drive openings 156. This clearance permits the movement of the axis of rotation of rotor 142 relative to the central axis of stator 130 (i.e., "wiggle" resulting from varying gap 152) as rotor 142 rotates in the direction of arrow 170. As rotor 142 rotates, the inner surfaces 172 of drive openings 156 engage drive rods 168 of drive assembly 158. This causes drive plate 160 and drive shaft 166 to rotate, providing a power output take off for the motor.

Figure 21:
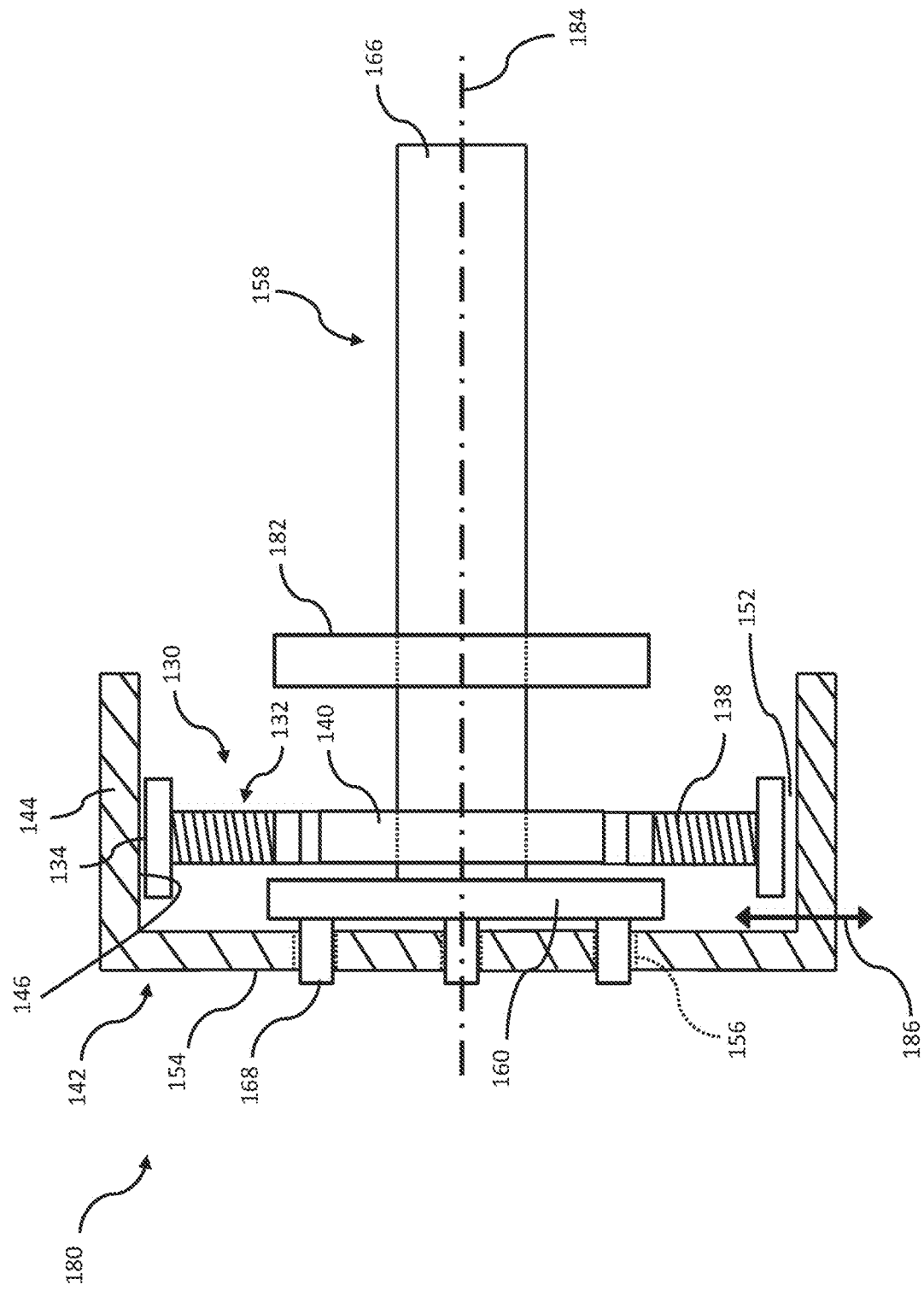
FIG. 21 is a side view, shown partly in section, of a motor including the stator, rotor and drive assembly as depicted in FIGS. 18-20.

FIG. 21 is a side view of a motor 180 according to the present disclosure having a rotor 142 and stator 130 as described above in an assembled condition (with some support structure omitted for clarity). As shown, drive assembly 158 (in particular, drive shaft 166) extends through bearing 140 of stator 130 and through a second bearing 182 to provide support for rotation of drive assembly 158 about axis 184. Rotor 142 is positioned on stator 130 and drive pins 168 of drive plate 160 extend into drive openings 156 of drive wall 154 of rotor 142. As windings 138 of stator poles 132 are activated in the manner described herein, contact surface 146 of rotor 142 rolls over contact surfaces 134 of poles 132. This causes rotation of rotor 142 about axis 184 as well as movement of rotor 142 radially in all directions toward and away from axis 84 as indicated for two directions by arrow 186. The rotational component of the movement of rotor 142 is transferred by drive openings 156 to drive rods 168 in the manner described above, thereby causing rotation of drive shaft 166 about axis 184.

Figure 22:
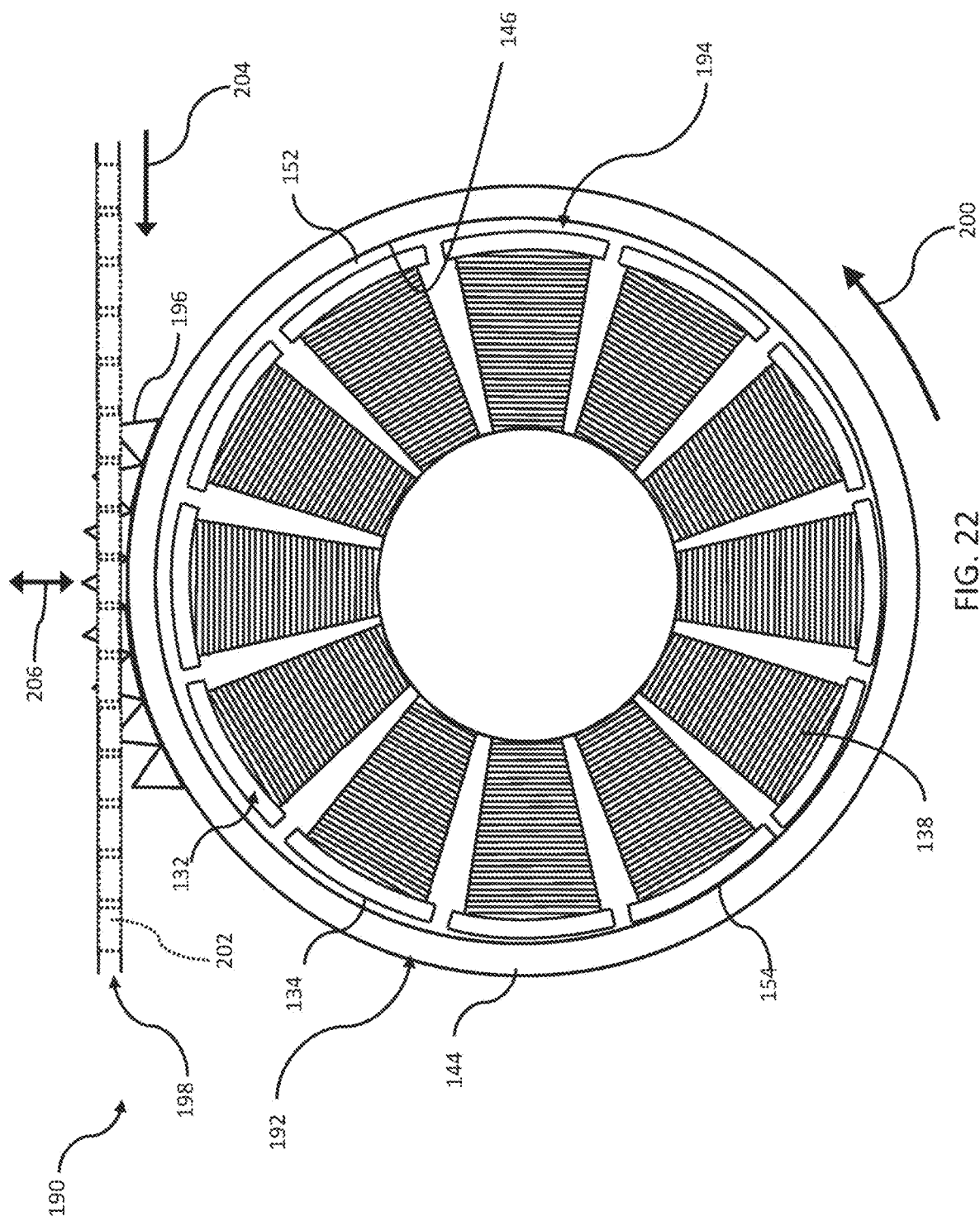
FIG. 22 is an end view of an alternative motor design according to the present disclosure.

Referring now to FIG. 22, another embodiment of a motor according to the principles of the present disclosure is shown. Motor 190 is similar in many respects to motor 180, and like components are labeled with the same reference numbers. Motor 190 generally includes rotor 192 and stator 194. Rotor 192 includes a plurality of surface features or teeth 196 that extend circumferentially along the outer surface of side wall 144 (only eight teeth 196 are shown for simplicity, but teeth 196 would extend around the entire perimeter of rotor 192). Stator 194 does not include a bearing 140 as did stator 180 because the drive mechanism for the motor is the interaction or meshing between teeth 196 and a transfer mechanism which is depicted in this embodiment as chain 198. As rotor 192 rotates about stator 194 in the direction of arrow 200, teeth 196 of rotor 192 enter into and engage surface features or openings 202 of chain 198 and drive chain 198 in the direction of arrow 204. The motion of rotor 192 in the plane of page as it rotates (and therefore such motion of teeth 196) as indicated by arrow 206 is accommodated by clearance between teeth 196 and openings 202. Chain 198 may be coupled to a load in any known manner.

It should be understood that the embodiment of FIG. 22 may be modified within the scope of the present disclosure to include various other surface features formed on rotor 192 such as teeth of various shapes that mesh with corresponding teeth of a drive gear or belt (instead of chain 198). Alternatively, the outer surface of rotor 192 may include surface features such as openings or recesses that receive projections of a chain, gear or other structure to transfer force from rotor 192 to the chain, gear or other structure. These various embodiments have the common characteristic that the rotational movement of rotor 192 is transferred to a drive element that is disposed outside rotor 192 rather than a drive element that is within rotor 192 (or offset from rotor 192 but still within an inner diameter projection of rotor 192) such as coaxial drive assembly 158 of FIG. 21.

Figure 23:
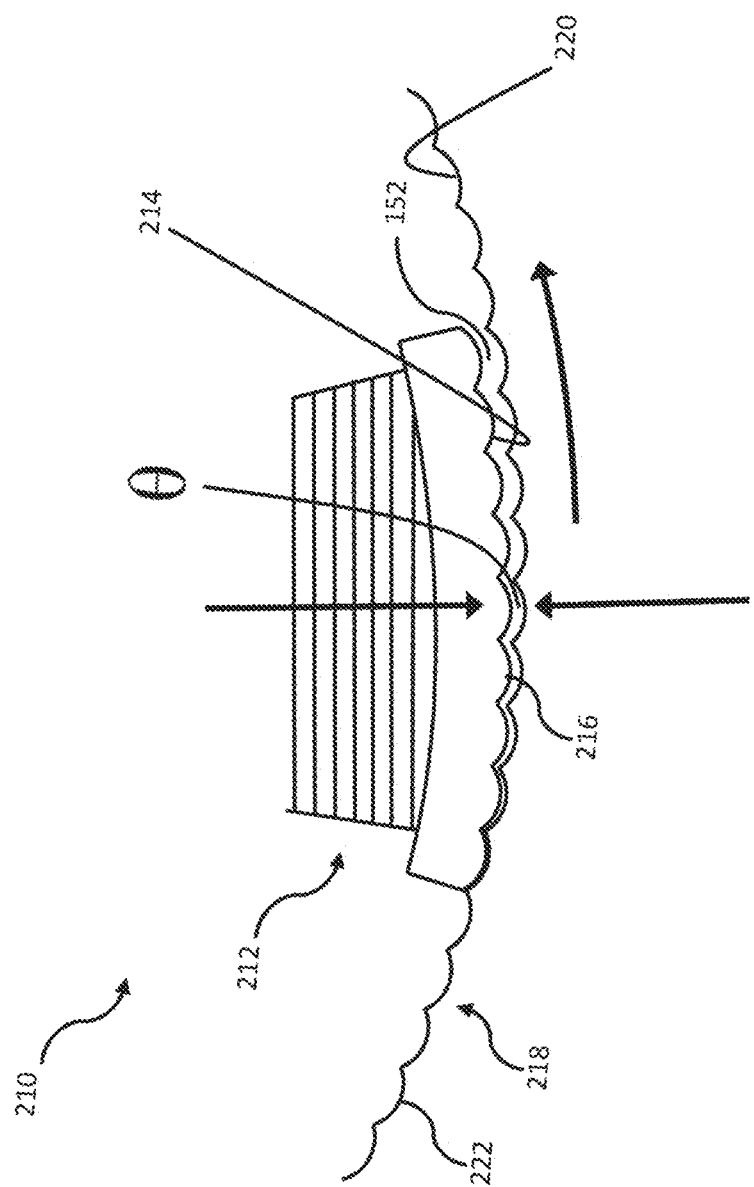
FIG. 23 is a partial end view of another alternative motor design according to the present disclosure.

Referring now to FIG. 23, yet another embodiment of a motor according to the present disclosure is depicted. In this embodiment, motor 210 includes poles 212 having contact surfaces 214 with convex scallops 216 (or other shapes substantially resembling a strain wave gear). Rotor 218 includes an inner contact surface 220 with corresponding concave scallops 222 that are sized and positioned to mesh with scallops 216 of poles 212. Of course, scallops 216 may alternatively be formed on contact surface 220 of rotor 218 and scallops 222 may be formed on contact surfaces 214 of poles 212. Other meshing shapes may be used. This configuration provides increased surface area of contact between contact surfaces 214 and contact surface 220 as compared to the embodiment of FIG. 17. It should be understood, however, that the meshing of scallops 216, 222 eliminates the ability of motor 210 to accommodate back drive of the load.

Figure 24:
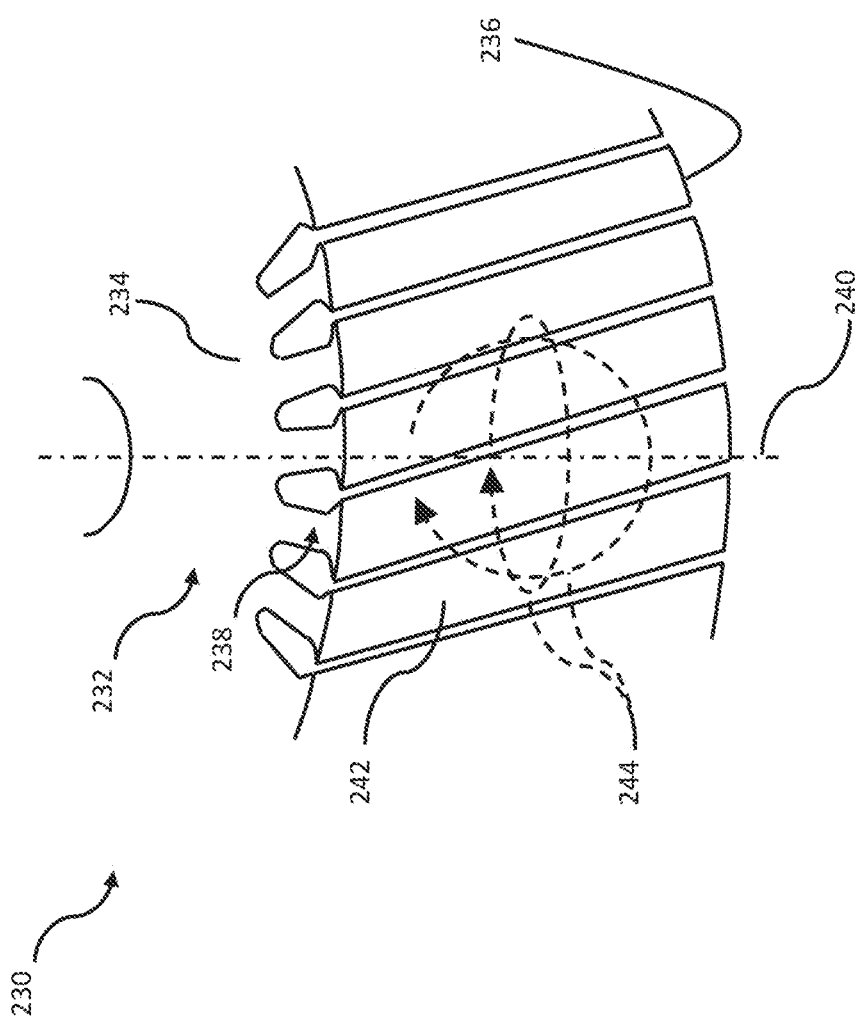
FIG. 24 is a perspective, partial view of an alternative stator design according to the present disclosure.

In yet a further variation of the embodiments disclosed above, poles having skewed lamination may be incorporated into the various stators. Referring back to FIG. 16, the small gap between the contact surfaces 134 of adjacent poles 132 results in a variation of the coefficient of friction in the torque equation as rotor 142 is transferred from pole 132 to pole 132. This may cause a ripple in the torque output by the motor and a chatter or noise during operation. A stator having skewed lamination for the poles 132 reduces or even eliminates these effects. As shown in FIG. 24, a stator 230 (only part of which is shown) having skewed lamination poles includes a body 232 having a first surface 234 and a second surface 236. Each of the poles 238 extend between first surface 234 and second surface 236 at an angle relative to a central axis 240 of stator 230. As such, when a rotor according to the present disclosure is rotated about stator 230 in the manner described above, the line of contact between the inner surface of the rotor and stator 230 will always be on an outer surface 240 of at least two poles 238. As such, the noise and torque ripple described above is reduced or eliminated.

As is understood by those skilled in the art, skewed lamination results in a three-dimensional electromagnetic field as indicated by field lines 244 in FIG. 24. To minimize the three-dimensional field eddy currents, stator 230 may be formed from materials that have isotropic properties in three dimensions.

In order to generate torque vs simple gyration (vibration) there must be some mechanism to transfer mechanical force from the stator to the rotor (or between two rotors); however, this does not need to be the ferromagnetic component. In alternative embodiments of the present disclosure, an engagement element of any material may be operationally coupled to the stator and/or the rotor and serve as the torque generation or transfer mechanism for the motor. Referring now to FIG. 28A, motor 312 includes a first magnetic component or stator 314 and a second magnetic component or rotor 316 which never contact one another. The gap 318 between stator 314 and rotor 316 remains non-zero (but varying) as rotor 316 rotates around stator 314 during operation. An engagement element 320 is coupled to stator 314 and an engagement element 322 is coupled to rotor 316. Engagement element 320 is offset from stator 314 along a central axis 315 of stator 314. Engagement element 322 is offset from rotor 316 along a central axis 317 of rotor 316. Engagement element 320 includes a plurality of surface features 324 (in this example, teeth) and engagement element 322 includes a corresponding plurality of surface features 326 (also teeth). As stator 314 is electromagnetically activated, the electromagnetic activation causes a change in the width of gap 318, but gap 318 remains non-zero. The change in gap 318, however, causes engagement element 320 to engage or contact engagement element 322, and the engagement between teeth 324, 326 causes engagement element 322 and rotor 316 to rotate about stator 314 in the manner described above. It should be understood that any of a variety of engagement elements may be used and be coupled to the magnetic components in a variety of ways to maintain a non-zero gap between the magnetic elements and generate torque by contact between the engagement elements.

An engagement element according to the present disclosure may comprise an intrinsically high friction surface material, such as aluminum or aluminum-silicon alloy, a shape that results in a high friction, such as gear teeth, or a material with a high friction coating, such as rubber, and may be placed at either end of a wound lamination stack or between a plurality of lamination stacks to indirectly translate the radial pressure between the stator and the rotor into torque. A similar engagement element may be inserted by rotor lamination segments to provide a corresponding wear surface. In this manner, the compressive force between the stator and the rotor are operationally transferred to their corresponding engagement elements, where the engagement elements make contact and operationally interact to translate the compressive force of the varying gap between the stator and the rotor to a rolling motion. While this decreases the total pole surface area for a given motor volume, it may enable each material to be optimized for a single function rather than compromise for both electromagnetic and mechanical properties. The engagement elements may also be positioned such that they enable a tight tolerance, very small gap between the stator and rotor during operation to prevent mechanical wear. This approach would also enable the stator and rotor to maintain a constant relative radius without the use of skewed laminations since the contact radius would be defined by the ring contact rather than the poles' shape. A large motor may have a plurality of engagement elements distributed throughout the length of the rotor and stator to provide even mechanical contact.

FIG. 28B depicts a similar embodiment. Here, motor 328 includes a stator 330 and a rotor 332 that contact one another in the manner described above (i.e., zero air gap operation). The torque generated by the varying air gap between stator 330 and rotor 332 is transferred by the interaction between the surface features 324, 326 of engagement elements 320, 322, respectively.

Figure 25:
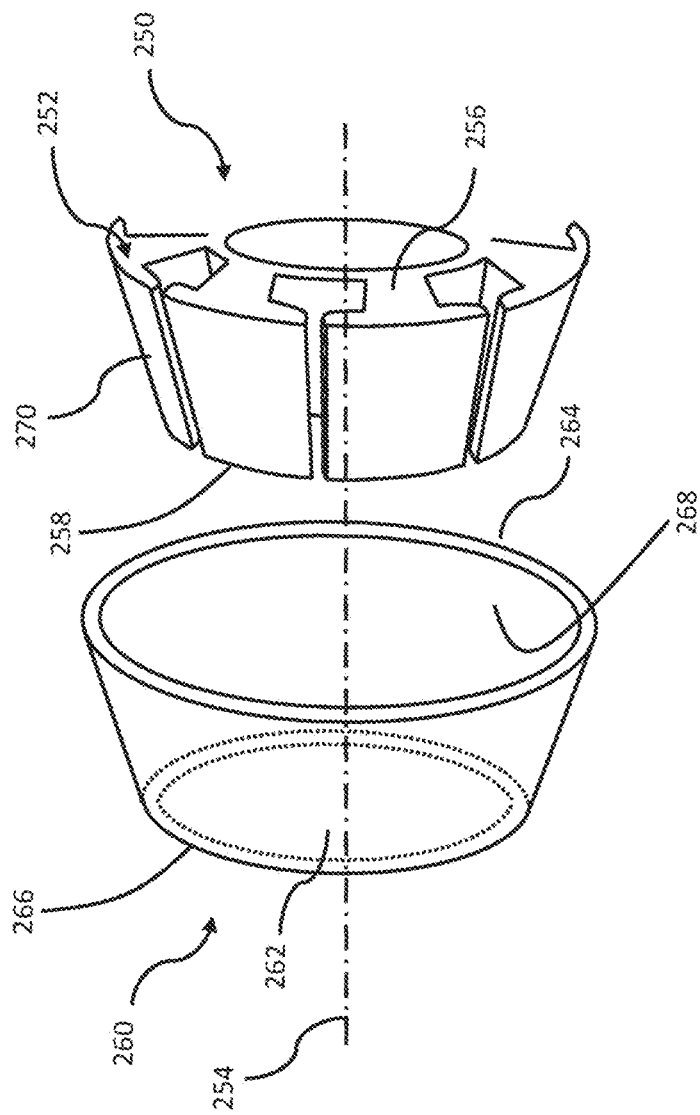
FIG. 25 is a perspective view of yet another alternative stator/rotor design according to the present disclosure.

In still another embodiment depicted in FIG. 25, a motor according to the present disclosure may be formed using a stator and rotor shaped as nested cones. More specifically, stator 250 (shown partially drawn) includes a plurality of poles 252 that taper toward central axis 254 of stator 250 with distance from first end 256 to second end 258. Rotor 260 similarly has a side wall 262 having an inner contact surface 268 that tapers in diameter from a first end 264 to a second end 266. Contact surface 268 of side wall 262 is diametrically larger than the diameter defined by the tapered contact surfaces 270 of poles 252, thereby forming the gap needed to generate the cycloidal rotary motion of rotor 260 as described herein.

The various embodiments of the present disclosure all permit not only driving rotary force to be transmitted to a drive element (e.g., a drive assembly, a chain, a gear, etc.), but each presents the possibility of simultaneously driving a load in two directions. More specifically, as each rotor moves both in a rotary fashion and radially inwardly and outwardly relative to the axis of rotary movement, the rotor may be configured to transfer both rotary motion and translational motion to a load (i.e., much like a hammer drill). The rotary motion may be transmitted in the manner described above with respect to the various embodiments disclosed. The translational motion (i.e., motion radially inwardly and outwardly relative to the axis of rotation and substantially perpendicular to the axis of rotation) may be transmitted, for example, by coupling side wall 144 of rotor 142 (see, e.g., FIG. 21) to a secondary drive assembly which transmits only translational movement to the load according to principles known in the art.

Referring again to FIG. 26, the stator and rotor may both roll about different axes, such that the air gap is asymmetric between the stator and the rotor. An electromagnetic field may be activated between the rolling stator and the rotor such that a rolling of both results in a decrease in the gap between the two. This may enable a DC current driven zero contact system to operate at high RPMs, by selectively exciting the rolling stator using electric brushes held at a static angle with respect to the two rolling surfaces. The rolling stator poles may be electrically isolated or diodes may be placed between the pole segments enabling excitation of only one portion of the rolling rotor. Again in this embodiment asymmetric excitation of a rotor results in production of torque as a function of a changing air gap. The gap may approach zero, or a small non-zero width.

If a flexible rotor is used, such as a wave gear in a strain-wave gearbox, two or more contact surfaces may be electromagnetically excited between the stator and rotor resulting in simultaneous rolling on more than one surface. This may further increase the torque density by activating a greater number of pole pieces at a time and by providing greater friction between the stator and rotor. It may also enable centric operation of a changing air gap motor of the present disclosure where the wiggle of multiple contact patches cancel with respect to the center of mass.

It should be understood that the stators described above could be activated according to a distributed pole strategy (i.e., overlapping) or a salient pole strategy (i.e., individually). To accommodate a distributed pole strategy, the side wall of the rotor would have to include a substantially increased thickness to account for magnetic saturation. It should further be understood that in the embodiments described above, various different drive shaft couplings may be utilized to account for misalignment (e.g., CV joints, universal joints, etc.). Finally, it should be understood by those skilled in the art with the benefit of the present disclosure that amorphous metal materials, nanocrystalline metals, high silicone content steel, etc. may be used to form the poles of the various stators to run at what is commonly known in the art as "medium frequency" (i.e., between about 1 KHz and 20 KHz). Typical electric motors operate within the 60 to 100 Hz range. Operating in the medium frequency range may permit use of electric motors of the type described herein in direct drive applications (e.g., for motor vehicles) where increased power (power=torque*RPM) is needed.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

I claim:

1. An electric motor, comprising:
a first magnetic component having a first surface;
a second magnetic component having a second surface that faces inwardly toward the first surface and being configured to rotate about a rotation axis that changes position relative to the first magnetic component during such rotation, the second surface forming a continuous circle having a constant diameter;
a non-magnetic liner positioned between the first magnetic component and the second magnetic component, the non-magnetic liner being formed as a coating onto the second magnetic component and positioned in a gap between the first magnetic component and the second magnetic component; and
a circuit configured to electromagnetically activate the first magnetic component;
wherein the first magnetic component includes a plurality of poles and the electromagnetic activation includes activating one pole to generate an electromagnetic force that draws a contact surface of the coated second magnetic component toward the one pole, and activating an adjacent pole and deactivating the one pole to draw the contact surface toward the adjacent pole;
wherein the electromagnetic activation causes the gap between the first surface and the second surface to have a variable width, thereby causing the coated second magnetic component to rotate about the rotation axis and roll on and in contact with the first magnetic component.

2. The electric motor of claim 1, wherein a surface velocity of the first surface is substantially the same as a surface velocity of the second surface during the rotation of the second magnetic component.

3. The electric motor of claim 1, wherein the gap results in movement of the rotation axis relative to the first magnetic component.

4. The electric motor of claim 1, wherein the non-magnetic liner is formed from plastic.

* * * * *